US012470297B2

(12) United States Patent
Bigongiari et al.

(10) Patent No.: US 12,470,297 B2
(45) Date of Patent: Nov. 11, 2025

(54) PHOTONIC RF SIGNAL GENERATION APPARATUS, NETWORK UNITS AND METHOD

(71) Applicant: Telefonaktiebolaget LM Ericsson (publ), Stockholm (SE)

(72) Inventors: Alessandra Bigongiari, Pisa (IT); Antonio D'Errico, Pisa (IT); Antonio Malacarne, Pisa (IT); Marco Secondini, Pisa (IT); Claudio Porzi, Pisa (IT)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 253 days.

(21) Appl. No.: 18/562,036

(22) PCT Filed: May 11, 2022

(86) PCT No.: PCT/EP2022/062857
§ 371 (c)(1),
(2) Date: Nov. 17, 2023

(87) PCT Pub. No.: WO2022/243140
PCT Pub. Date: Nov. 24, 2022

(65) Prior Publication Data
US 2024/0235682 A1    Jul. 11, 2024

(30) Foreign Application Priority Data

May 19, 2021   (WO) ................. PCT/EP2021/063285

(51) Int. Cl.
*H04B 10/2575*   (2013.01)
*H04B 10/50*     (2013.01)
(52) U.S. Cl.
CPC ......... *H04B 10/2575* (2013.01); *H04B 10/50* (2013.01)

(58) Field of Classification Search
None
See application file for complete search history.

(56) References Cited

U.S. PATENT DOCUMENTS 7,133,610 B1 * 11/2006 Shimura .......... H04B 10/50575
                                                    398/198
10,050,722 B2 *  8/2018 Quinlan ................. H04B 10/90
(Continued)

FOREIGN PATENT DOCUMENTS

WO    2015073183 A1    5/2015
WO    2022214177 A1   10/2022

OTHER PUBLICATIONS

Ito, "High-Speed and High-Output InP-InGaAs Unitraveling-Carrier Photodiodes", IEEE Journal of Selected Topics in Quantum Electronics, vol. 10, No. 4, Jul./Aug. 2004, pp. 709-727 (Year: 2004).*

(Continued)

*Primary Examiner* — Darren E Wolf
(74) *Attorney, Agent, or Firm* — Weisberg I.P. Law, P.A.

(57) ABSTRACT

A photonic radio frequency, RF, signal generation apparatus has a source to output a coherent optical signal at a carrier frequency; an optical splitter to split the signal into a first and a second optical carrier signal; an RF signal generation apparatus generating an RF signal at an initial frequency; an optical modulation apparatus modulating the first and second signals at the initial frequency to generate optical harmonic signals around each signal; a first optical filter to select an nth order optical harmonic signal of a first sign, +n, of the optical harmonics around the first signal; a second optical filter to select the nth order optical harmonic signal of an opposite sign, −n, of the optical harmonics around the second signal; and a combiner to combine the selected +n and −n signals to generate an optical beat signal forming an output photonic RF signal.

19 Claims, 13 Drawing Sheets

(56) References Cited

U.S. PATENT DOCUMENTS

| | | | |
|---|---|---|---|
| 2004/0208644 A1* | 10/2004 | Sirat | H04B 10/2575 398/186 |
| 2008/0112705 A1 | 5/2008 | Ridgway et al. | |
| 2011/0013907 A1* | 1/2011 | Sugihara | G02F 1/0123 398/38 |
| 2019/0004341 A1 | 1/2019 | Puleri et al. | |

OTHER PUBLICATIONS

International Search Report and Written Opinion dated Oct. 25, 2022 for International Application No. PCT/EP2022/062857 filed May 11, 2022, consisting of 18-pages.

L. Vera et al.; A Low-Power SiGe Feeback Amplifier with Over 110GHz Bandwidth; 2014 IEEE Bipolar/BiCMOS Circuits and Technology Meeting (BCTM); 2014, consisting of 4-pages.

T. H. Kim et al.; Dual Loop Optoelectronic Oscillator with Acousto-Optic Delay Line; Journal of the Optical Society of Korea, vol. 20, No. 2; Apr. 2016, consisting of 5-pages.

D. Li et al.; Efficient laser noise reduction method via actively stabilized optical delay line; Optical Society of America; vol. 25, No. 8; Apr. 17, 2017, consisting of 7-pages.

G. Qi et al.; Phase-Noise Analysis of Optically Generated Millimeter-Wave Signals With External Optical Modulation Techniques; Journal of Lightwave Technology, vol. 24, No. 12; Dec. 2006, consisting of 15-pages.

TSG-RAN Working Group 4 (Radio) meeting #96-E R4-2010176; Title: On 52.6 to 71 GHz phase noise characteristics and draft LS to RAN1; Agenda Item: 13.2.2; Source: Ericsson; Document for: Approval; Date and Location: Aug. 17-28, 2020, Electronic Meeting, consisting of 17-pages.

C. Porzi et al.; Silicon Photonics High-Order Distributed Feedback Resonators Filters; IEEE Journal of Quantum Electronics, vol. 56, No. 1; Feb. 2020, consisting of 9-pages.

* cited by examiner

PHOTONIC RF SIGNAL GENERATION APPARATUS, NETWORK UNITS AND METHOD

CROSS-REFERENCE TO RELATED APPLICATIONS

This application is a Submission Under 35 U.S.C. § 371 for U.S. National Stage Patent Application of International Application No.: PCT/EP2022/062857, filed May 11, 2022 entitled "PHOTONIC RF SIGNAL GENERATION APPARATUS, NETWORK UNITS AND METHOD," which claims priority to International Application No.: PCT/EP2021/063285, filed May 19, 2021, entitled "PHOTONIC RF SIGNAL GENERATION APPARATUS, NETWORK UNITS AND METHOD," the entireties of both of which are incorporated herein by reference.

TECHNICAL FIELD

The invention relates to photonic radio frequency, RF, signal generation apparatus and to a communications network node comprising the photonic RF signal generation apparatus. The invention further relates to a communications network antenna element. The invention further relates to RF signal multiplication apparatus. The invention further relates to a method of generating a multiplied RF signal, a method of generating a photonic RF signal and a method at a communications network antenna element.

BACKGROUND

At present, deployed mid-band radios operate on a frequency band that is around 3.5 Ghz or 6 GHz. New Radio hardware, in 5G deployment and beyond, will be transmitting at a higher frequency, in the Extremely High-Frequency range (30-300 GHz), also known as the mmW domain.

Devices operating at high frequency need to generate a reference clock at the operating frequency. This reference clock is commonly obtained from a reference at a lower frequency that is upconverted in an electrical multiplier. This enables a low-frequency reference to be transmitted on electrical lines without losses and signal integrity problems.

Current solutions for the generation of a high-frequency RF carrier signals are commonly based on the use of synthesizers which produce the desired frequency by multiplying a reference frequency from a local oscillator, in a Phase-Locked Loop, PLL, circuit. The PLL comprises a phase detector that returns a signal proportional to the phase difference of the input reference frequency $f_{IN}$ and the output frequency $f_{OUT}$. A loop filter is coupled to the output of the phase detector and is a low pass filter that reduces jitter in noisy inputs and selects the desired phase difference. The output of the loop filter is a voltage which is used to control a voltage controlled oscillator, VCO, so that is generates an oscillating electrical signal. The VCO is forced to settle on a value that matches the long-term average of the input frequency. The value of "long term average" is determined by the characteristics of the loop components, including the low-pass filter. The reference frequency is generally a crystal with high spectral purity that is multiplied several times. However, the multiplication steps tend to increase inherent phase noise of the reference and add further noise sources. This results in the production of relevant phase noise in high-frequency clock signals obtained through several PLL multiplication stages.

Phase noise generation is one of the most detrimental effects for radio performance since it determines effects such as Common Phase Error, CPE, due to constellation rotation of an orthogonal frequency division multiplexing, OFDM, signal, and Inter-carrier Interference, ICI. Phase noise increases with RF carrier frequency, due to higher multiplication factors required in the PLL and generally lower performance of electronics in the high-frequency range. At present the countermeasure taken to handle phase noise for high carrier frequencies consists of increasing the spacing between OFDM subcarriers. In 5G the subcarrier spacing is flexible and can range from 15 to 240 KHz; large OFDM subcarrier spacing corresponds to higher RF carrier frequencies.

Current solutions based on frequency multiplication may be very efficient. However, the frequency multiplication process causes multiplication of any phase noise in the reference frequency, resulting in a high-frequency signal with significant phase noise. Ideally, for a pure multiplication of the reference frequency, the final phase noise can be derived from the phase noise, PN, of the reference frequency, $PN_{ref}$, using the following:

$$PN = PN_{ref} + 20^* \log(N) \; dBc/Hz \qquad (1)$$

where N is the multiplication factor. It is desirable to have N as low as possible, to minimise multiplication of phase noise in the reference frequency. However, this option is limited by the availability of oscillators able to generate high enough reference frequencies, together with their cost and power consumption. Commonly, crystal oscillators are employed, generating a reference frequency of around 40-100 MHZ, with low power consumption. Crystals providing higher reference frequencies exist, but there is no proof this would improve the phase noise of the output high frequency signal.

High-frequency synthesiser solutions incur an unavoidable increase of phase noise when delivering a carrier frequency in the high-frequency range. A countermeasure might be to increase the subcarrier spacing to reduce ICI, but this would limit the utilization of the available bandwidth. One of the reasons why future radio deployments target high carrier frequencies is to deliver a larger capacity due to the larger bandwidth. If subcarrier spacing increases, the bandwidth increase brought by the high-frequency range may be significantly decreased.

US 2019/0004341 describes an opto-electronic oscillator comprising: an optical source to generate an optical carrier signal having a carrier wavelength; an optical phase modulator to apply a sinusoidal phase modulation to the optical carrier signal to generate two first order sidebands having a π phase difference between them; an optical phase shifter comprising an optical resonator configured to apply a substantially π phase-shift to one of the first order sidebands at a preselected wavelength within an optical spectrum of said first order sideband; and a photodetector configured to perform optical heterodyne detection of the optical carrier signal with both: said one of the first order sidebands substantially π phase shifted by the optical resonator; and the other of the first order sidebands, to generate an electrical carrier signal. A first part of the electrical carrier signal is delivered to an electrical output and a second part of the electrical carrier signal is delivered to the optical phase modulator as a drive signal. The oscillator enables an RF carrier to be produced that has very low phase noise with respect to a state of art electrical frequency multiplier, thanks to the feedback mechanism where the signal detected at the output of the optical oscillator is used in the modulator driver.

SUMMARY

It is an object to provide an improved Photonic radio frequency, RF, signal generation apparatus. It is a further object to provide an improved communications network node. It is a further object to provide an improved communications network antenna element. It is a further object to provide an improved RF signal multiplication apparatus. It is a further object to provide an improved method of generating a multiplied RF signal. It is a further object to provide an improved method of generating a photonic RF signal. It is a further object to provide an improved method at a communications network antenna element.

An aspect of the invention provides photonic radio frequency, RF, signal generation apparatus comprising a coherent optical source, an optical splitter, RF signal generation apparatus, optical modulation apparatus, a first optical filter, a second optical filter and an optical combiner. The coherent optical source is operable to output a coherent optical signal at a carrier frequency, $f_0$. The optical splitter is arranged to split the coherent optical signal into a first optical carrier signal and a second optical carrier signal. The RF signal generation apparatus is operable to generate at least one RF signal (V(t)) at an initial frequency, $f_e$. The optical modulation apparatus is driven by the at least one RF signal and is operable to modulate the first optical carrier signal and the second optical carrier signal at the initial frequency to generate a plurality of optical harmonic signals around each optical carrier signal. The first optical filter is configured to select an nth order optical harmonic signal of a first sign, +n, of the plurality of optical harmonics around the first optical carrier signal. The second optical filter configured to select the nth order optical harmonic signal of an opposite sign, −n, of the plurality of optical harmonics around the second optical carrier signal. The optical combiner is arranged to combine the selected +n optical harmonic signal with the selected −n optical harmonic signal to generate an optical beat signal forming an output photonic RF signal.

The apparatus enables generation of a photonic RF signal in which optical phase noise is reduced or cancelled and phase noise introduced by the optical modulation apparatus is a pure multiple of the phase noise of the RF signal at the initial frequency. The apparatus thus advantageously enables the total phase noise of a photonic RF signal to be reduced as compared to the prior art, without requiring any modulation drive signal feedback mechanism. The apparatus may advantageously produce a high-frequency photonic RF signal from the multiplication of a low frequency oscillator or synthesizer, without adding any extra optical noise.

In an embodiment, the RF signal generation apparatus comprises an RF signal generator operable to generate an RF signal (V(t)) at the initial frequency, $f_e$.

In an embodiment, the optical modulation apparatus comprises a bi-directional optical modulator. The apparatus further comprises a first optical path from the optical splitter to the optical combiner for the first optical carrier signal and a second optical path from the optical splitter to the optical combiner for the second optical carrier signal. The first optical path includes: a path section including the bi-directional optical modulator operable to modulate the first optical carrier signal propagating in a first direction; and the first optical filter. The second optical path includes: the path section including the bi-directional optical modulator further operable to modulate the second optical carrier signal propagating in a second, opposite direction; and the second optical filter.

In an embodiment, the optical modulation apparatus comprises a first optical modulator operable to modulate the first optical carrier signal and a second optical modulator operable to modulate the second optical carrier signal. The apparatus further comprises a first optical path from the optical splitter to the optical combiner for the first optical carrier signal and a second optical path from the optical splitter to the optical combiner for the second optical carrier signal. The first optical path includes the first optical modulator and the first optical filter. The second optical path includes the second optical modulator and the second optical filter.

In an embodiment, the apparatus further comprises optical delay apparatus arranged to apply a delay, τ, to optical signals, the optical delay apparatus being arranged to apply the delay to the first optical carrier signal and to apply the delay to at least the −n optical harmonic signal.

The optical delay apparatus enables the apparatus to reduce or cancel phase noise introduced by the RF signal at the initial frequency that drives the optical modulation apparatus, i.e. the phase noise inherited from the RF signal, that is multiplied by twice the harmonic order, is reduced or cancelled. The apparatus may thereby generate a photonic RF signal in which both optical phase noise and electrical phase noise are reduced or cancelled. The apparatus may advantageously reduce the total phase noise of the photonic RF signal as compared to the prior art. The apparatus advantageously enables a high-frequency photonic RF signal to be produced from the multiplication of a low frequency RF signal generator, such as an oscillator or synthesizer, without adding any extra optical noise and reducing or cancelling the noise inherited from the RF signal generator.

The introduced delay may advantageously produce deep notches in the phase noise profile of the photonic RF signal at frequencies, $f_m$, (where $f_m$ is the distance from the carrier frequency, $f_0$), that substantially cancel the noise locally and produce an overall decrease of the phase noise. The location of the notches can be selected by selecting the value of the delay t; the notches are located at the zeros of the function $\cos^2(\tau \pi f_m)$. For an orthogonal frequency division multiplexing, OFDM, transmission scheme, the apparatus enables cancellation of the phase noise at the OFDM subcarrier frequencies so that it is not necessary to allow extra spacing among subcarriers, and spectral efficiency is thereby increased.

In an embodiment, the optical delay apparatus is arranged to apply the delay to the first optical carrier signal before the first optical carrier signal is modulated by the optical modulation apparatus and to apply the delay to at least the −n optical harmonic signal before the optical combiner combines the −n optical harmonic signal with the selected +n optical harmonic signal.

The optical delay apparatus advantageously enables the introduced delay to affect only the electrical noise of one of the optical harmonic signals that are combined to produce the output photonic RF signal, while maintaining the optical correlation of the two optical harmonic signals when they are combined.

In an embodiment, the optical delay element is a bi-directional delay element configured to apply the delay, τ, to optical signals. The bi-directional delay element is provided within an optical path section. The optical path section is included in the first optical path to apply the delay to the first optical carrier signal and the optical path section is included in the second optical path to apply the delay to at least the −n optical harmonic signal.

The bi-directional delay element may enable the apparatus to have a compact footprint.

In an embodiment, the apparatus further comprises a first delay element and a second delay element. The first delay element is provided in the first optical path before the first optical modulator and is configured to apply a delay, τ, to the first optical carrier signal. The second delay element is provided in the second optical path after the second optical modulator and is configured to apply the delay, τ, to at least the −n optical harmonic signal.

In an embodiment, the optical delay apparatus is a tunable optical delay apparatus. The delay, τ, can thus be increased or decreases and the apparatus is thus advantageously able to account for carrier spacing flexibility in 5G with a single design, avoiding hardware variants.

In an embodiment, the RF signal generation apparatus comprises a first RF signal generator and a second RF signal generator. The first RF signal generator is operable to generate a first RF signal ($V_1(t)$) at the initial frequency, $f_e$, having a first phase, $\phi_{e1}(t)$. The second RF signal generator is operable to generate a second RF signal ($V_2(t)$ at the initial frequency, $f_e$, having a second phase, $\phi_{e2}(t)$, uncorrelated to the first phase. The optical modulation apparatus comprises a first optical modulator and a second optical modulator. The first optical modulator is driven by the first RF signal ($V_1(t)$ and the second optical modulator is driven by the second RF signal ($V_2(t)$). The first optical modulator is operable to modulate the first optical carrier signal and the second optical modulator is operable to modulate the second optical carrier signal.

By generating the harmonics using two different optical modulators, driven by independent RF synthesizers providing the same electrical frequency, $f_e$, but with the phases uncorrelated, a uniform reduction (i.e. independent of frequency), of the phase noise from the electrical RF drive signals is achieved as compared to using a single RF signal generator to drive both optical modulators. Use of two independent RF signal generators ensures that the phases of the first and second RF signals are fully uncorrelated.

In an embodiment, the apparatus further comprises a first optical path and a second optical path. The first optical path is from the optical splitter to the optical combiner for the first optical carrier signal. The first optical path includes the first optical modulator and the first optical filter. The second optical path is from the optical splitter to the optical combiner for the second optical carrier signal. The second optical path includes the second optical modulator and the second optical filter.

In an embodiment, the first and second optical filters are tunable optical filters. The first and second optical filters can advantageously be tuned to transmit a selected order optical harmonic signal of the plurality of optical harmonic signals.

In an embodiment, the first and second optical filters are configured to select one of a first order to a tenth order optical harmonic signal of the plurality of optical harmonic signals.

In an embodiment, the initial RF frequency, $f_e$, is in the range 5-15 GHZ.

In an embodiment, the optical splitter, the optical modulation apparatus, the first and second optical filters, and the optical combiner are fabricated as a silicon photonic integrated circuit.

In an embodiment, the apparatus further comprises a plurality of optical splitters configured to split the optical beat signal to form a plurality of output photonic RF signals. The apparatus advantageously enables distribution of the photonic RF signal to a plurality of locations, such as the RF integrated circuits, RFICs, of an array of antenna elements.

In an embodiment, the plurality of optical splitters are arranged in a plurality of splitting stages. At least a second one of the plurality of splitting stages is followed by an amplification stage comprising a plurality of optical amplifiers arranged to amplify respective optical beat signals. The apparatus advantageously enables distribution of the photonic RF signal to a large number of locations, such as the RF integrated circuits, RFICs, of an array of antenna elements.

Corresponding embodiments and advantages apply to the communications network node, the RF signal multiplication apparatus and the methods described below.

An aspect of the invention provides a communications network node comprising photonic radio frequency, RF, signal generation apparatus. The photonic RF signal generation apparatus comprises a coherent optical source, an optical splitter, RF signal generation apparatus, optical modulation apparatus, a first optical filter, a second optical filter and an optical combiner. The coherent optical source is operable to output a coherent optical signal at a carrier frequency, $f_0$. The optical splitter is arranged to split the coherent optical signal into a first optical carrier signal and a second optical carrier signal. The RF signal generation apparatus is operable to generate at least one RF signal (V(t)) at an initial frequency, $f_e$. The optical modulation apparatus is driven by the at least one RF signal and is operable to modulate the first optical carrier signal and the second optical carrier signal at the initial frequency to generate a plurality of optical harmonic signals around each optical carrier signal. The first optical filter is configured to select an nth order optical harmonic signal of a first sign, +n, of the plurality of optical harmonics around the first optical carrier signal. The second optical filter configured to select the nth order optical harmonic signal of an opposite sign, −n, of the plurality of optical harmonics around the second optical carrier signal. The optical combiner is arranged to combine the selected +n optical harmonic signal with the selected −n optical harmonic signal to generate an optical beat signal forming an output photonic RF signal.

In an embodiment, the node is one of a baseband unit or a remote radio unit. A baseband unit, BBU, is thus advantageously enabled to provide a photonic RF signal to an antenna element of a remote radio unit, RRU, or an RRU is advantageously enabled to provide a photonic RF signal to an antenna element of the RRU.

Corresponding embodiments and advantages apply to the corresponding method described below.

An aspect provides a communications network antenna element comprising an optical input, a photodetector and a radio frequency integrated circuit, RFIC. The optical input is for receiving a photonic RF signal comprising an optical beat signal. The photodetector is configured to detect the optical beat signal and output a corresponding electrical signal at an RF frequency, $2nf_e$. The RFIC is configured to receive the electrical signal.

The antenna element may advantageously receive a low phase-noise, high frequency RF signal for use by its RFIC.

In an embodiment, the electrical signal forms a reference clock signal for the RFIC. The antenna element may advantageously receive a low phase-noise, high frequency reference clock signal for use by its RFIC.

Corresponding embodiments and advantages apply to the corresponding method described below.

An aspect of the invention provides radio frequency, RF, signal multiplication apparatus comprising a coherent optical source, an optical splitter, RF signal generation apparatus, optical modulation apparatus, a first optical filter, a second optical filter, an optical combiner and a photodetector. The coherent optical source is operable to output a coherent optical signal at a carrier frequency, $f_0$. The optical splitter is arranged to split the coherent optical signal into a first optical carrier signal and a second optical carrier signal. The RF signal generation apparatus is operable to generate at least one RF signal (V(t) at an initial frequency, $f_e$. The optical modulation apparatus is driven by the at least one RF signal and is operable to modulate the first optical carrier signal and the second optical carrier signal at the initial frequency to generate a plurality of optical harmonic signals around each optical carrier signal. The first optical filter is configured to select an nth order optical harmonic signal of a first sign, +n, of the plurality of optical harmonics around the first optical carrier signal. The second optical filter configured to select the nth order optical harmonic signal of an opposite sign, −n, of the plurality of optical harmonics around the second optical carrier signal. The optical combiner is arranged to combine the selected +n optical harmonic signal with the selected −n optical harmonic signal to generate an optical beat signal forming an output photonic RF signal. The photodetector is configured to receive the photonic RF signal and configured to detect the optical beat signal and output a corresponding electrical signal at a multiplied RF frequency, $2nf_e$.

The apparatus enables generation of a photonic RF signal in which optical phase noise is reduced or cancelled and phase noise introduced by the optical modulation apparatus is a pure multiple of the phase noise of the RF signal at the initial frequency. The apparatus thus advantageously enables the total phase noise of the multiplied RF signal to be reduced as compared to the prior art, without requiring any modulation drive signal feedback mechanism. The apparatus may advantageously enable a high-frequency RF signal to be produced from the multiplication of a low frequency oscillator or synthesizer, without adding any extra optical noise. The apparatus may advantageously provide a stable low noise RF signal even at the higher frequencies being demanded by new wireless communications technologies such as 5G New Radio. The use of photonic generation means that the generated RF signal may be more accurate, less noisy and more stable. The RF signal can be carried optically over long distances before conversion into an electrical RF signal which eliminates the electromagnetic interference that an electrical RF signals would otherwise be subject to.

In an embodiment, the electrical signal forms a reference clock signal.

In an embodiment, the multiplied RF frequency, $2nf_e$, is in the frequency range 70-120 GHZ.

In an embodiment, the apparatus further comprises a radio frequency integrated circuit, RFIC, configured to receive the electrical signal.

Corresponding embodiments and advantages apply to the corresponding method described below.

An aspect of the invention provides a method of generating a multiplied radio frequency, RF, signal. The method comprises steps as follows. A coherent optical signal is generated at a carrier frequency, $f_0$. The coherent optical signal is split into a first optical carrier signal and a second optical carrier signal. At least one initial RF signal is generated at an initial frequency, $f_e$. The first optical carrier signal is modulated using the at least one initial RF signal at the initial frequency to generate a plurality of optical harmonic signals around the first optical carrier signal. An nth order optical harmonic signal of a first sign, +n, of the plurality of optical harmonic signals around the first optical carrier signal is selected. The second optical carrier signal is modulated using the initial RF signal at the initial frequency to generate said plurality of optical harmonic signals around the second optical carrier signal. The nth order optical harmonic signal of an opposite sign, −n, of the plurality of optical harmonic signals around the second optical carrier signal is selected. The selected +n optical harmonic signal is combined with the selected −n optical harmonic signal to generate an optical beat signal forming an output photonic RF signal. The photonic RF signal is received, the optical beat signal is detected and a corresponding electrical signal at a multiplied RF frequency, $2nf_e$, is output In an embodiment, the electrical signal forms a reference clock signal.

In an embodiment, the multiplied RF frequency, $2nf_e$, is in the frequency range 70-120 GHz.

An aspect of the invention provides a method of generating a photonic radio frequency, RF, signal. The method comprises steps as follows. A coherent optical signal is generated at a carrier frequency, $f_0$. The coherent optical signal is split into a first optical carrier signal and a second optical carrier signal. At least one initial RF signal is generated at an initial frequency, $f_e$. The first optical carrier signal is modulated using the at least one initial RF signal at the initial frequency to generate a plurality of optical harmonic signals around the first optical carrier signal. An nth order optical harmonic signal of a first sign, +n, of the plurality of optical harmonic signals around the first optical carrier signal is selected. The second optical carrier signal is modulated using the initial RF signal at the initial frequency to generate said plurality of optical harmonic signals around the second optical carrier signal. The nth order optical harmonic signal of an opposite sign, −n, of the plurality of optical harmonic signals around the second optical carrier signal is selected. The selected +n optical harmonic signal is combined with the selected −n optical harmonic signal to generate an optical beat signal forming a photonic RF signal. The photonic RF signal is transmitted.

In an embodiment, the method further comprises apply a delay, t, to optical signals. The delay is applied to the first optical carrier signal and to at least the −n optical harmonic signal.

In an embodiment, the delay, t, is applied to the first optical carrier signal before modulating the first optical carrier signal, and the delay, t, is applied to at least the −n optical harmonic signal before combining the −n optical harmonic signal with the selected +n optical harmonic signal.

An aspect of the invention provides a method at communications network antenna element. The method comprises steps as follows. A photonic RF signal comprising an optical beat signal is received. The optical beat signal is detected. A corresponding electrical signal at an RF frequency, $2nf_e$, is output to a radio frequency integrated circuit, RFIC, of the antenna element.

In an embodiment, the electrical signal forms a reference clock signal for the RFIC.

Embodiments of the invention will now be described, by way of example only, with reference to the accompanying drawings.

BRIEF DESCRIPTION OF THE DRAWINGS

FIG. 12 is a block diagram illustrating an embodiment of a remote radio unit, RRU;

DETAILED DESCRIPTION

The same reference numbers will be used for corresponding features in different embodiments.

Figure 1A:
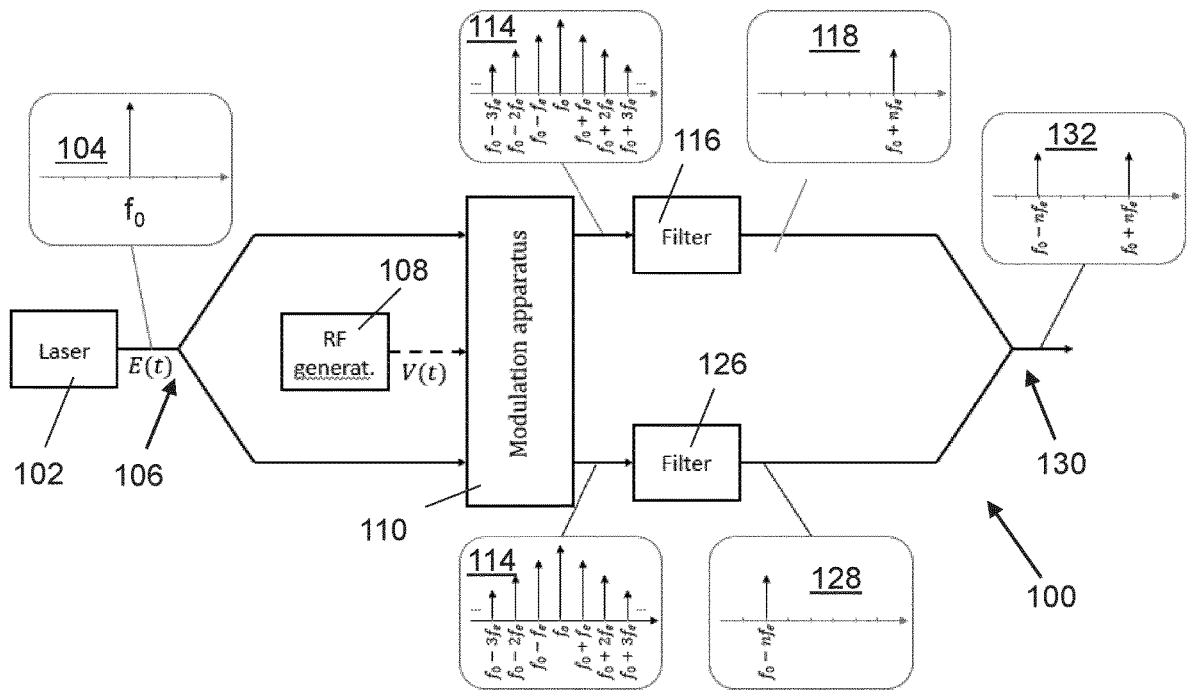
FIGS. 1 to 8 are block diagrams illustrating embodiments of photonic radio frequency, RF, signal generation apparatus.
Figure 1B:
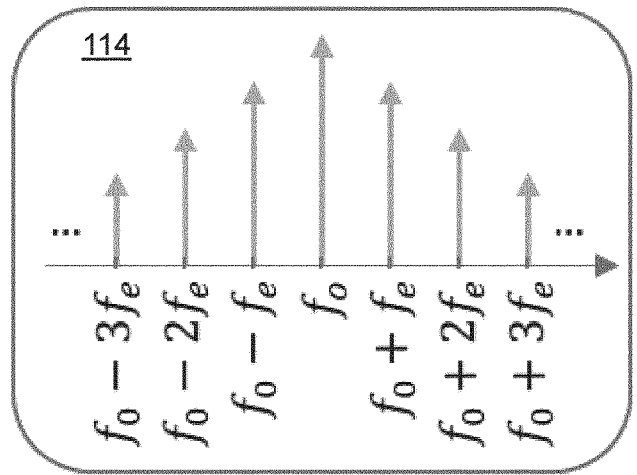

An embodiment provides photonic RF signal generation apparatus 100 as illustrated in FIGS. 1a and 1b. The apparatus comprises a coherent optical source 102, an optical splitter 106, RF signal generation apparatus 108, optical modulation apparatus 110, a first optical filter 116, a second optical filter 126 and an optical combiner 130.

The coherent optical source comprises a laser operable to output a coherent optical signal, E(t), 104 at a carrier frequency, $f_0$:

$$E(t) = E_o \cos[2\pi f_o t + \phi_o(t)]$$

where $E_0$ is the amplitude of the electric field of the optical carrier and $\phi_0(t)$ is the phase noise of the optical carrier.

The optical splitter 106 is arranged to split the coherent optical signal into a first optical carrier signal, which follows the upper path in FIG. 1a, and a second optical carrier signal, which follows the lower path.

The RF signal generation apparatus 108 comprises an RF signal generator, for example, an electrical RF synthesizer, is operable to generate an RF signal (V(t) at an initial frequency, $f_e$:

$$V(t) = V_e \cos[2\pi f_e t + \phi_e(t)]$$

where $V_e$ is the amplitude of the electric field of the RF signal and $\phi_e(t)$ is the electrical phase noise of the RF signal.

The optical modulation apparatus 110 is driven by the RF signal and is operable to modulate the first optical carrier signal and the second optical carrier signal at the initial frequency, $f_e$, to generate a plurality of optical harmonic signals 114 around each optical carrier signal, as illustrated in FIG. 1b and the insets 114 of FIG. 1a. Corresponding sets of optical harmonic signals are produced on either side of the each optical carrier signal; the harmonics are increasing multiples of the modulation frequency and are spaced by the modulation frequency, in this case the initial frequency, $f_e$, on both sides of the carrier frequency, $f_0$.

The first optical filter 116 is configured to select an nth order optical harmonic signal 118 of a first sign, +n, of the plurality of optical harmonics around the first optical carrier signal, i.e. the nth order harmonic, $f_o+nf_e$, on the right of the carrier frequency, $f_0$. That is to say, the first optical filter is configured to transmit at a frequency, $f = f_o + nf_e$ The second optical filter 126 is configured to select the corresponding nth order optical harmonic signal 128 of an opposite sign, −n, of the plurality of optical harmonics around the second optical carrier signal, i.e. the nth order harmonic, $f_o-nf_e$, on the left of the carrier frequency, $f_0$. That is to say, the second optical filter is configured to transmit at a frequency, $$f = f_o - nf_e$$

The optical combiner 130 is arranged to combine the selected +n optical harmonic signal with the selected −n optical harmonic signal to generate an optical beat 132 signal forming an output photonic RF signal:

$$E(t) = E_o J_n(\beta)\{\cos[2\pi(f_0 - nf_e)t + \phi_o(t) - n\phi_e(t)] + \cos[2\pi(f_0 + nf_e)t + \phi_o(t) + n\phi_e(t)]\}$$

where:

$E_o$ is the amplitude of the electric field of the optical carrier $J_n$ is Bessel function of the first kind of order n $\beta$ is the modulation index that depends on the characteristics of the modulator:

$$\beta = \frac{\pi}{2V_\pi} V_e$$

for an amplitude modulator and $$\beta = \frac{\pi}{V_\pi} V_e$$

for a phase modulator, where $V_e$ is the amplitude of the electrical drive signal and $V_\pi$ is the half-wave voltage $\phi_o(t)$ is the phase noise of the optical carrier $\phi_e(t)$ is the phase noise of the electric signal that drives the modulator The phase noise of the optical carrier signal is cancelled due to the coherence of the coherent optical source that transfers the same phase noise to the optical harmonics. The electrical phase noise, from the RF signal, is multiplied, so that the photonics RF signal includes a pure multiplication of the electrical phase noise by a multiplication factor that depends on the order of the optical harmonics that are combined. Then the power spectral density of the phase noise associated with the optical beat signal is related to the original phase noise of the RF signal, $S_{\phi_e}(f)$, as $$S_\phi(f) = S_{\phi_e}(f)(2n)^2 \qquad \text{(Equation 1)}$$

Figure 2:
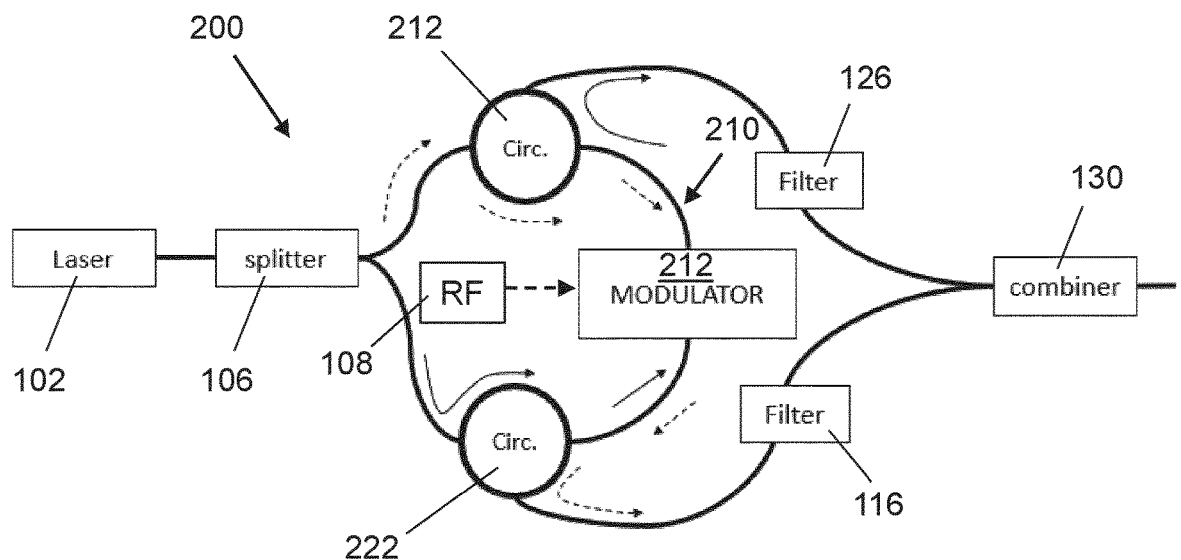

In an embodiment, illustrated in FIG. 2, the optical modulation apparatus comprises a bi-directional optical modulator 212. The photonic RF generation apparatus 200 of this embodiment further comprises a first optical path from the optical splitter 106 to the optical combiner 130 for the first optical carrier signal and a second optical path from the optical splitter to the optical combiner for the second optical carrier signal.

The first optical path (indicated by dashed arrows), which may be formed in optical waveguides or by optical fibres, comprises a first optical circulator 212, a path section 210 including the bi-directional optical modulator 212, a second optical circulator 222 and the first optical filter 116. The bi-directional optical modulator is operable to modulate the first optical carrier signal propagating in a first direction (indicated by the dashed arrows), as described above.

The second optical path (indicated by solid arrows), which may also be formed in optical waveguides or by optical fibres, comprises the second optical circulator 222, the path section 210 including the bi-directional optical modulator 212, the first optical circulator 212 and the second optical filter 126. The bi-directional optical modulator 212 is further operable to modulate the second optical carrier signal propagating in a second, opposite direction (indicated by the solid arrows), as described above.

Figure 3:
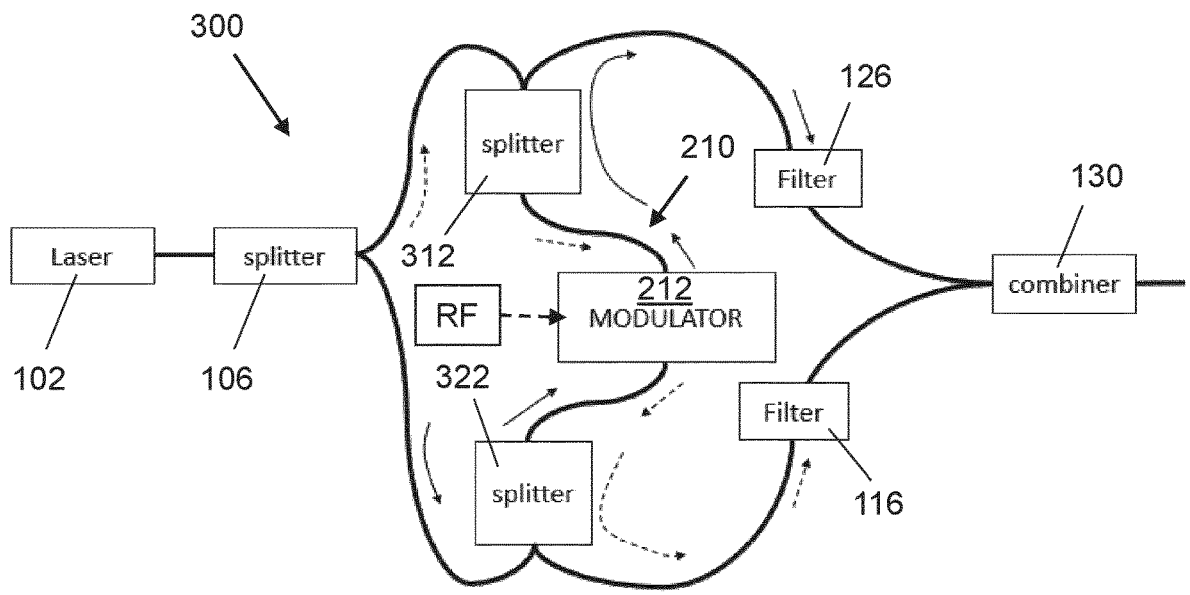

First and second optical splitters 312, 322 may be used instead of optical circulators, as in the photonic RF generation apparatus 300 illustrated in FIG. 3. The coherent optical source would be provided with an isolator in front of the laser, to protect the laser from backwards travelling optical signals from the optical splitters.

Figure 4:
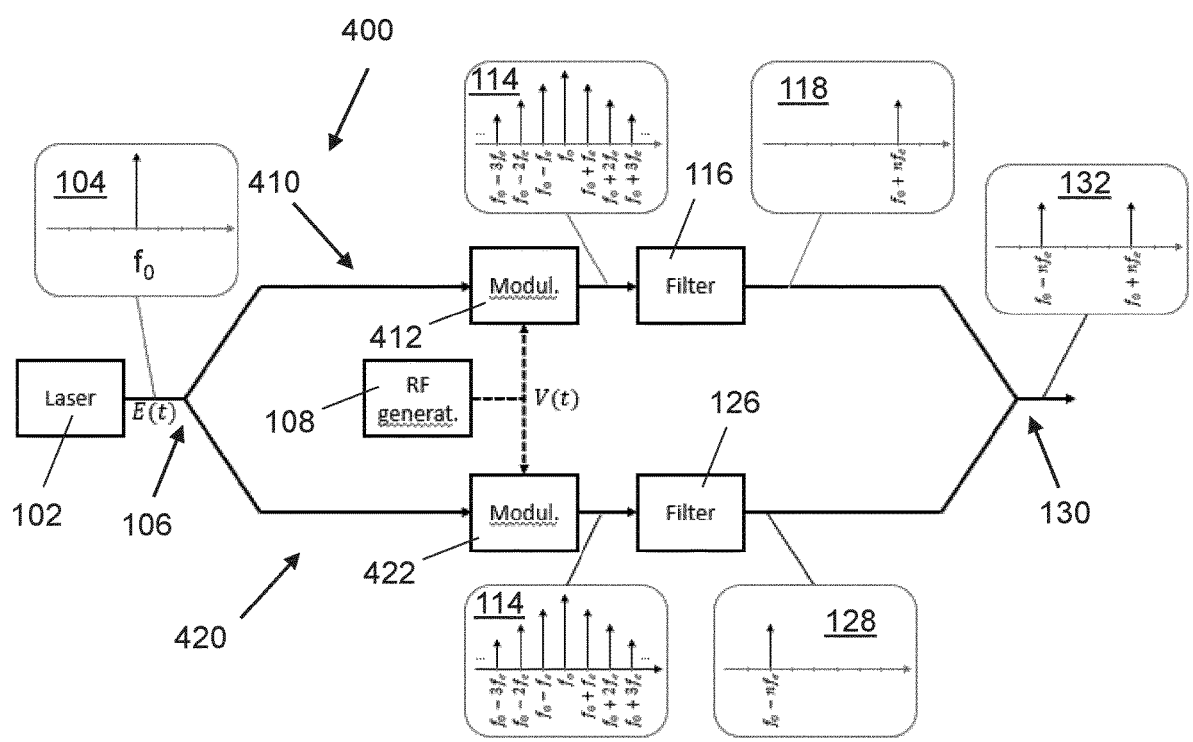

In an embodiment, illustrated in FIG. 4, the optical modulation apparatus comprises a first optical modulator 412 and a second optical modulator 422. The photonic RF generation apparatus 400 of this embodiment further comprises a first optical path 410 from the optical splitter 106 to the optical combiner 130 for the first optical carrier signal and a second optical path 420 from the optical splitter to the optical combiner for the second optical carrier signal.

The first optical path, which may be formed in optical waveguides or by optical fibres, comprises the first optical modulator 412 and the first optical filter 116. The first optical modulator 412 is operable to modulate the first optical carrier signal, as described above. The second optical path, which may also be formed in optical waveguides or by optical fibres, comprises the second optical modulator 422 and the second optical filter 126. The second optical modulator is operable to modulate the second optical carrier signal, as described above.

Figure 5:
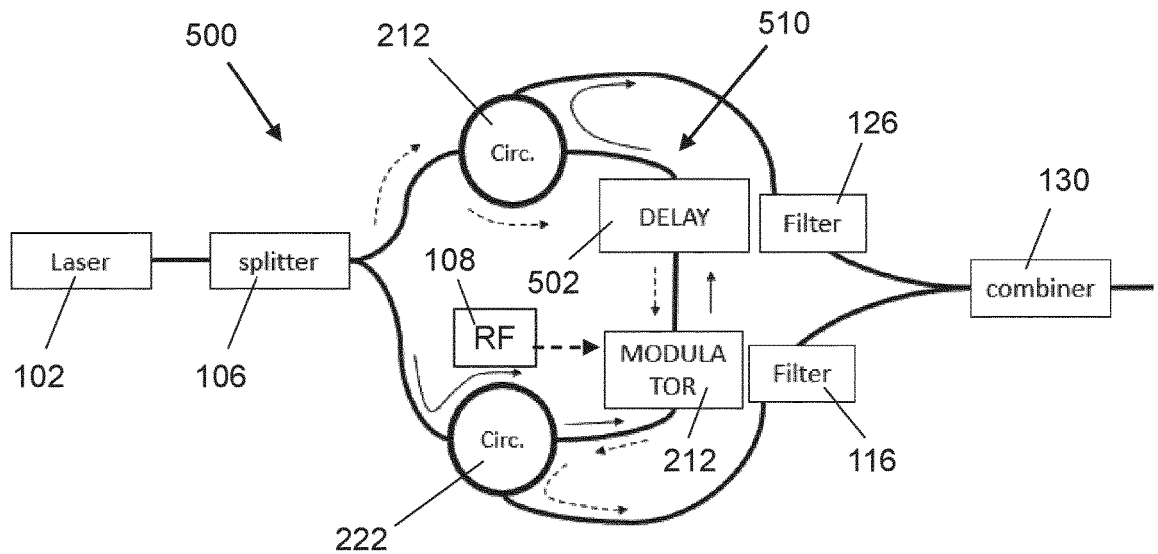

In an embodiment, as illustrated in FIG. 5, the photonic RF signal generation apparatus 500 further comprises optical delay apparatus 502 arranged to apply a delay, t, to optical signals. The optical delay apparatus is arranged to apply the delay to the first optical carrier signal and to apply the delay to at least the −n optical harmonic signal. The optical delay apparatus in this embodiment is a bi-directional delay element 502, provided within the first optical path and the second optical path as described above with reference to FIG. 2. The bi-directional delay element is configured to apply a delay, τ, to optical signals transmitted through it in either direction. The first optical path (indicated by dashed arrows), comprises the first optical circulator 212, a path section 510 including the bi-directional optical modulator 212 and the bi-directional delay element 502, the second optical circulator 222 and the first optical filter 116. The bi-directional delay element 502 applies a delay, τ, to the first optical carrier signal propagating in a first direction (indicated by the dashed arrows). The delay is therefore applied to the first optical carrier signal before it is modulated by the bi-directional optical modulator 212.

The second optical path (indicated by solid arrows) comprises the second optical circulator 222, the path section 510 including the bi-directional optical modulator 212 and the bi-directional delay element 502, the first optical circulator 212 and the second optical filter 126. The bi-directional delay element 502 applies the same delay, τ, to the second optical carrier signal and its optical harmonic signals propagating in the second, opposite direction (indicated by the solid arrows).

The optical delay apparatus is thus arranged to apply the delay to the first optical carrier signal before the first optical carrier signal is modulated by the optical modulator 212 and to apply the delay to at least the −n optical harmonic signal before it is combined in the optical combiner 130 with the selected +n optical harmonic signal.

Applying the delay to the first carrier signal before modulation and to the optical harmonic generated from the second carrier signal, i.e. after modulation of the second carrier signal, means that the delay only affects the electrical phase noise of one of the combined optical harmonic signals, i.e. the one selected from the second optical carrier's optical harmonics, while maintaining the optical correlation of the two optical harmonic signals that are combined to form the optical beat signal, thus maintaining the optical phase noise cancellation.

The phase noise of the optical carrier signal is cancelled due to the coherence of the coherent optical source that transfers the same phase noise to the optical harmonics, as described above.

First and second optical splitters may be used instead of the first and second optical circulators. The coherent optical source would be provided with an isolator in front of the laser, to protect the laser from backwards travelling optical signals from the optical splitters.

In an embodiment, the bi-directional delay element 502 is a tunable delay element. The delay, τ, can therefore be increased or decreased to a required delay in order to generate a phase noise spectrum including notches as required.

Figure 6:
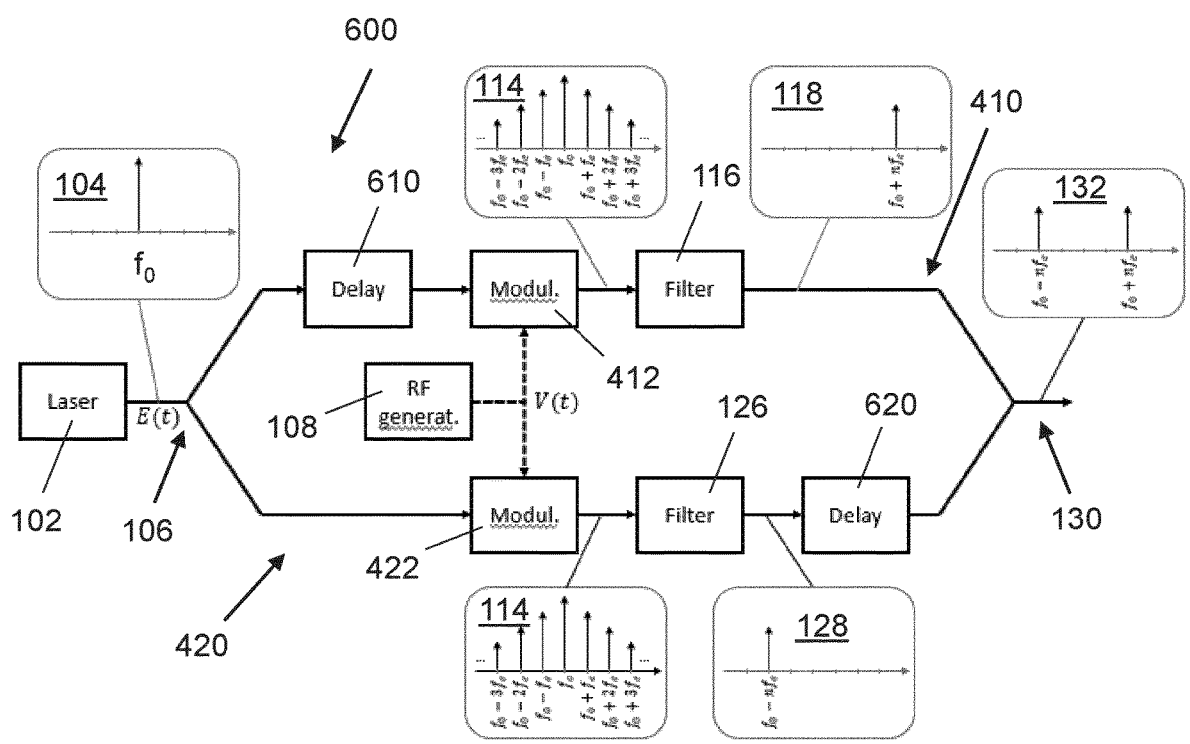

In an embodiment, as illustrated in FIG. 6, the photonic RF signal generation apparatus 600 further comprises optical delay apparatus arranged to apply a delay, τ, to optical signals. The optical delay apparatus is arranged to apply the delay to the first optical carrier signal and to apply the delay to at least the −n optical harmonic signal. The optical delay apparatus in this embodiment comprises a first delay element 610 and a second delay element 620. The first delay element is provided in the first optical path 410, as described above with reference to FIG. 4, and the second delay element is provided in the second optical path 420.

The first delay element 610 is provided before the first optical modulator 412 and configured to apply a delay, z, to the first optical carrier signal 104. The second delay element 620 is provided after the second optical modulator 422 and the second optical filter 126, and is configured to apply the delay, t, to the selected −n optical harmonic signal, $f_o$−n$f_e$ 128, transmitted by the second optical filter 126.

Figure 14:
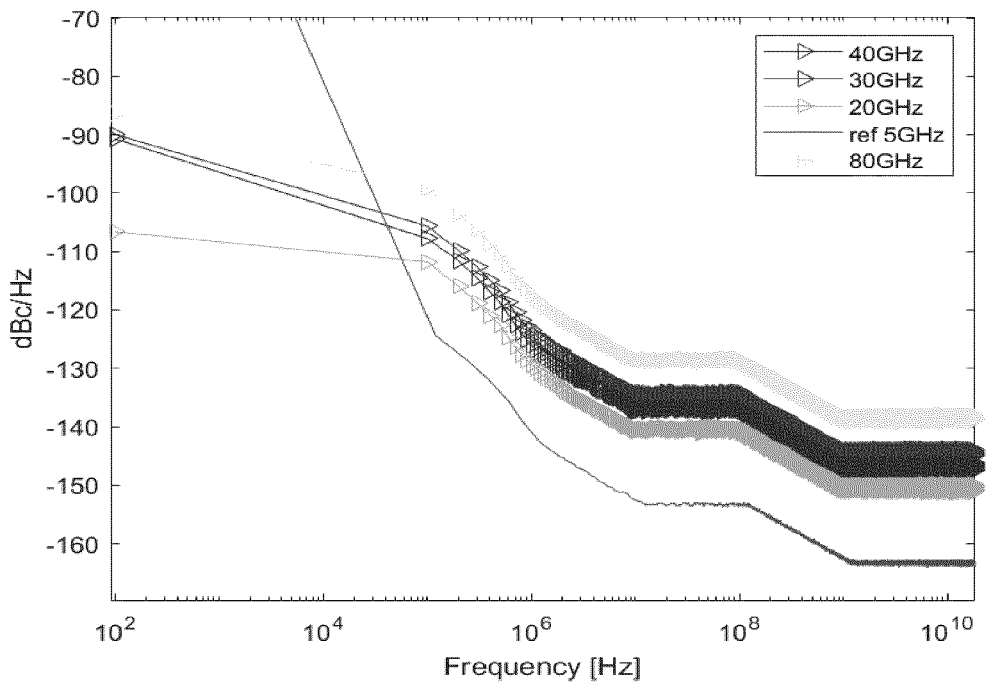
FIGS. 14 and 15 show simulation results.

The optical combiner 130 is arranged to combine the selected +n optical harmonic signal with the selected −n optical harmonic signal to generate an optical beat 132 signal forming an output photonic RF signal:

$$E(t) = E_o J_n(\beta) \left\{ \cos\left[2\pi f_0(t-\tau) + 2\pi n f_e t + \phi_o(t-\tau) + n\phi_e(t) + n\frac{\pi}{2}\right] + \cos\left[2\pi(f_0 - nf_e)(t-\tau) + \phi_o(t-\tau) - n\phi_e(t-\tau) - n\frac{\pi}{2}\right] \right\},$$

where:
$E_o$ is the amplitude of the electric field of the optical carrier
$J_n$ is Bessel function of the first kind of order n β is the modulation index that depends on the characteristics of the modulator:

$$\beta = \frac{\pi}{2V_\pi} V_e$$

for an amplitude modulator and $$\beta = \frac{\pi}{V_\pi} V_e$$

for a phase modulator, where $V_e$ is the amplitude of the electrical drive signal and $V_\pi$ is the half-wave voltage $\phi_o(t)$ is the phase noise of the optical carrier $\phi_e(t)$ is the phase noise of the electric signal that drives the modulator Then the power spectral density of the phase noise associated with the optical beat signal is related to the original phase noise of the RF signal, $S_{\phi_e}(f)$, as $$S_\phi(f) = S_{\phi_e}(f)(2n)^2 \cos^2(\pi\tau f)$$

which shows that it is possible to cancel the phase noise locally by setting the proper delay. This enables notches 1400 to be created in the phase noise spectrum, as shown in FIG. 14.

The optical delay apparatus is thus arranged to apply the delay to the first optical carrier signal before the first optical carrier signal is modulated by the first optical modulator 412 and to apply the delay to at least the −n optical harmonic signal before it is combined in the optical combiner 130 with the selected +n optical harmonic signal.

Applying the delay to the first carrier signal before modulation and to the optical harmonic generated from the second carrier signal, i.e. after modulation of the second carrier signal, means that the delay only affects the electrical phase noise of one of the combined optical harmonic signals, i.e. the one selected from the second optical carrier's optical harmonics, while maintaining the optical correlation of the two optical harmonic signals that are combined to form the optical beat signal, thus maintaining the optical phase noise cancellation.

In an embodiment, the first optical filter 116 and the second optical filter 126 are tunable optical filters. The order of optical harmonic signals that are selected for combination into the optical beat signal can therefore be varied according to the desired multiplication of the initial frequency of the RF signal driving the optical modulation apparatus.

In an embodiment, the first optical filter 116 and the second optical filter 126 are configured to select one of a first order to a tenth order optical harmonic signal of the plurality of optical harmonic signals. A multiplication of up to ten times the initial frequency of the RF signal driving the optical modulation apparatus can thus be achieved.

In an embodiment, the initial RF frequency, $f_e$, is in the range 5-15 GHZ.

In an embodiment, the optical splitter 106, the optical modulation apparatus 110, 212, 412, 422, the first optical filter 116, the second optical filter 126, and the optical combiner 130 are fabricated as a silicon photonic integrated circuit.

Figure 7:
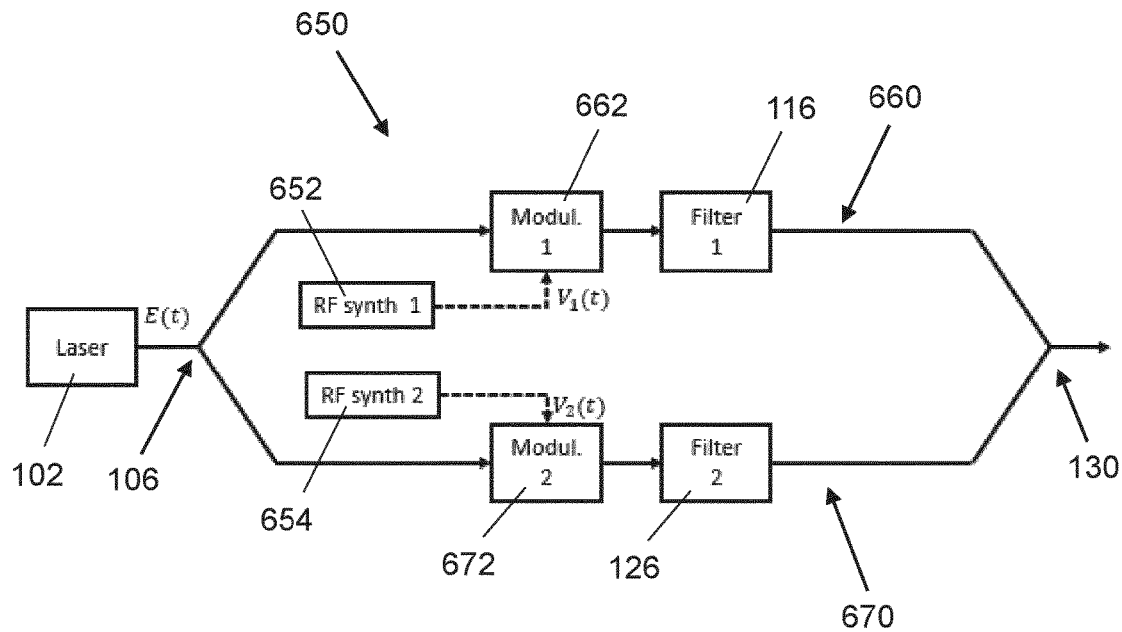

Referring to FIG. 7, an embodiment provides photonic RF signal generation apparatus 650 in which the RF signal generation apparatus comprises a first RF signal generator, for example an electrical RF synthesizer 652, and a second RF signal generator, an electrical RF synthesizer 654.

The first RF signal generator is operable to generate a first RF signal ($V_1(t)$ at the initial frequency, $f_e$, having a first phase, $\phi_{e1}$ (t):

$$V_1(t) = V_e \cos[2\pi f_e t + \phi_{e1}(t)]$$

The second RF signal generator is operable to generate a second RF signal ($V_2(t)$) at the initial frequency, $f_e$, having a second phase, $\phi_{e2}(t)$, uncorrelated to the first phase:

$$V_2(t) = V_e \cos[2\pi f_e t + \phi_{e2}(t)]$$

The optical modulation apparatus comprises a first optical modulator 662 driven by the first RF signal ($V_1(t)$ and a second optical modulator 672 driven by the second RF signal ($V_2(t)$. The first optical modulator is operable to modulate the first optical carrier signal and the second optical modulator is operable to modulate the second optical carrier signal.

The RF signal generation apparatus 650 of this embodiment further comprises a first optical path 660 and a second optical path 670. The first optical path is for the first optical carrier signal and extends from the optical splitter to the optical combiner. The first optical path includes the first optical modulator 662 and the first optical filter 116. The second optical path is for the second optical carrier signal and extends from the optical splitter to the optical combiner. The second optical path includes the second optical modulator 672 and the second optical filter 126.

The laser 102 generates an optical carrier at frequency $f_o$. The electrical field of the optical carrier is given by:

$$E(t) = E_o \cos[2\pi f_o t + \phi_o(t)]$$

The first optical filter 116 is configured to select an nth order optical harmonic signal 118 of a first sign, +n, of the plurality of optical harmonics around the first optical carrier signal, i.e. the nth order harmonic, $f_o + nf_e$, on the right of the carrier frequency, $f_0$. That is to say, the first optical filter is configured to transmit at a frequency, $f = f_o + nf_e$ The second optical filter 126 is configured to select the corresponding nth order optical harmonic signal 128 of an opposite sign, −n, of the plurality of optical harmonics around the second optical carrier signal, i.e. the nth order harmonic, $f_o - nf_e$, on the left of the carrier frequency, $f_0$. That is to say, the second optical filter is configured to transmit at a frequency, $$f = f_o - nf_e$$

The optical combiner 130 is arranged to combine the selected +n optical harmonic signal with the selected −n optical harmonic signal to generate an optical beat 132 signal forming an output photonic RF signal. When the output photonic RF signal is detected by a square-law photodiode, the output is given by:

$$I(t) \propto \cos[2\pi(2nf_e)t + \phi(t)]$$

where $\phi(t) = 2n\dfrac{\phi_{e1}(t) + \phi_{e2}(t)}{2}$ the power spectral density of the phase noise associated with the optical beat signal is related to the original phase noises of the first and second RF signals can be expressed as $$S_\phi(f) = n^2(S_{\phi_{e1}}(f) + S_{\phi_{e2}}(f))$$

where $S_{\phi_{e1}}(f)$ and $S_{\phi_{e2}}(f)$ are the power spectral densities of the phase noise of the first and second RF signals respectively.

In the case where the two electrical RF synthesizers have similar quality, i.e., they produce two phase noise terms with the same power spectral density $S_{\phi_{e1}}(f) = S_{\phi_{e2}}(f) = S_{\phi_e}(f)$, the power spectral density of the phase noise associated with the optical beat signal can be expressed as $$S_\phi(f) = 2n^2 S_{\phi_e}(f)$$

This is a factor of two lower than the power spectral density of the phase noise noise associated with the optical beat signal in the above embodiments having a single RF signal generator, described above.

By generating the harmonics using two different optical modulators, driven by independent RF synthesizers providing the same electrical frequency, $f_e$, but with the phases uncorrelated, a uniform reduction (i.e. independent of frequency), of the phase noise from the electrical RF drive signals is achieved as compared to using a single RF signal generator to drive both optical modulators. Use of two independent RF signal generators ensures that the phases of the first and second RF signals are fully uncorrelated.

This embodiment implements the following steps:

A coherent optical source (e.g. a laser) is split into two optical carriers each travelling along a different optical path. Each carrier is sent to an optical modulator, in a configuration in which different, uncorrelated electrical RF signals drive the two optical modulators with a modulation frequency, $f_e$.

A set of harmonics is generated in each carrier by the optic modulators with a non-linear characteristic. The group of harmonics, also named 'comb' are multiples of the modulation frequency $f_e$. The two RF signal generators are set to the same frequency $f_e$.

Selection of one harmonic in each optical branch via a filter, all other harmonics are substantially eliminated. To guarantee the reduction of phase noise the harmonic selected in the first carrier has to be of the same order of the harmonic selected in the second carrier, but opposite in sign: e.g. order n in the first carrier and −n in the second carrier The two carriers are merged to generate a beat signal from the harmonic n and −n, and the beat signal is photo-detected to output an electric signal at the RF frequency.

In an embodiment, the first optical filter 116 and the second optical filter 126 are tunable optical filters. The order of optical harmonic signals that are selected for combination into the optical beat signal can therefore be varied according to the desired multiplication of the initial frequency of the RF signal driving the optical modulation apparatus.

In an embodiment, the first optical filter 116 and the second optical filter 126 are configured to select one of a first order to a tenth order optical harmonic signal of the plurality of optical harmonic signals. A multiplication of up to ten times the initial frequency of the RF signal driving the optical modulation apparatus can thus be achieved.

In an embodiment, the initial RF frequency, $f_e$, is in the range 5-15 GHZ.

In an embodiment, the optical splitter 106, the optical modulation apparatus 662, 672, the first optical filter 116, the second optical filter 126, and the optical combiner 130 are fabricated as a silicon photonic integrated circuit.

Figure 8:
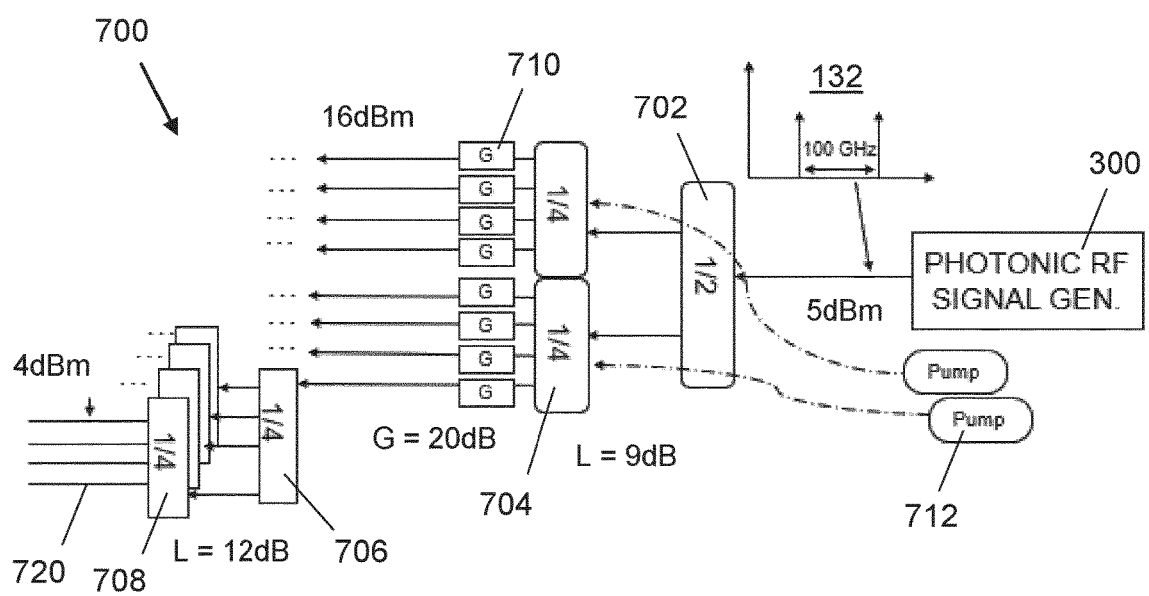

In an embodiment, as illustrated in FIG. 8, the photonic RF signal generation apparatus 700 further comprises a plurality of optical splitters 702, 704, 706, 708 configured to split the optical beat signal to form a plurality of output photonic RF signals 720.

The optical splitters are arranged in a plurality of splitting stages. The first splitting stage comprises a 1:2 splitter 702, the second splitting stage comprises two 1:4 splitters 704, the third splitting stage comprises eight 1:4 splitters 706 and the fourth splitting stage comprises thirty-two 1:4 splitters 708. The optical beat signal 132 output from the photonic RF signal generator 300, is therefore split into 128 output photonic RF signals 720.

The second splitting stage is followed by an amplification stage comprising a plurality of optical amplifiers 710 arranged to amplify respective optical beat signals. In this example, eight erbium doped fiber amplifiers 710 pumped by two 900 nm pump sources 712 are provided after the splitters 704. The amplifiers provide a gain, G, of 20 dB; this is sufficient to overcome a 9 dB loss between the first and second stage splitters, and amplify the eight split signals to 16 dBm, to pre-compensate for a 12 dB loss between the third and fourth stage splitters. A 5 dBm optical beat signal 132 is thereby split into 128 output photonic RF signals 720 each of 4 dBm power.

This configuration is advantageous since a single RF generator, and thus a single photonic RF signal generator, is able to feed 128 antenna element RFICs. The cost and power consumption is therefore split among the antenna elements so that it is comparable to (or lower than) the power consumption of a state of the art phase locked loop operating in this frequency range, since one phase locked loop is required for each RFIC.

Figure 9:
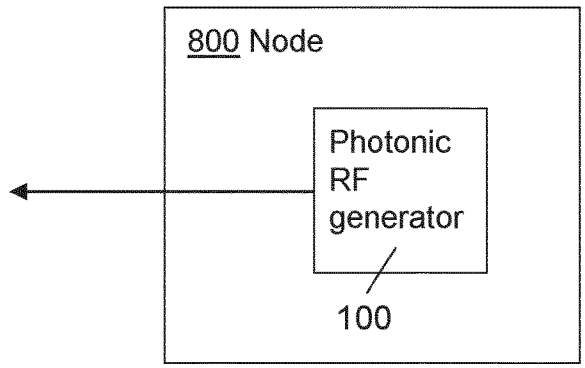
FIGS. 9 and 10 are block diagrams illustrating embodiments of communications network nodes.

An embodiment, illustrated in FIG. 9, provides a communications network node 800 comprising photonic RF signal generation apparatus 100. It will be appreciated that any of the photonic RF signal generation apparatus 200, 300, 400, 500, 600 described above may alternatively be used in the node 800.

Figure 10:
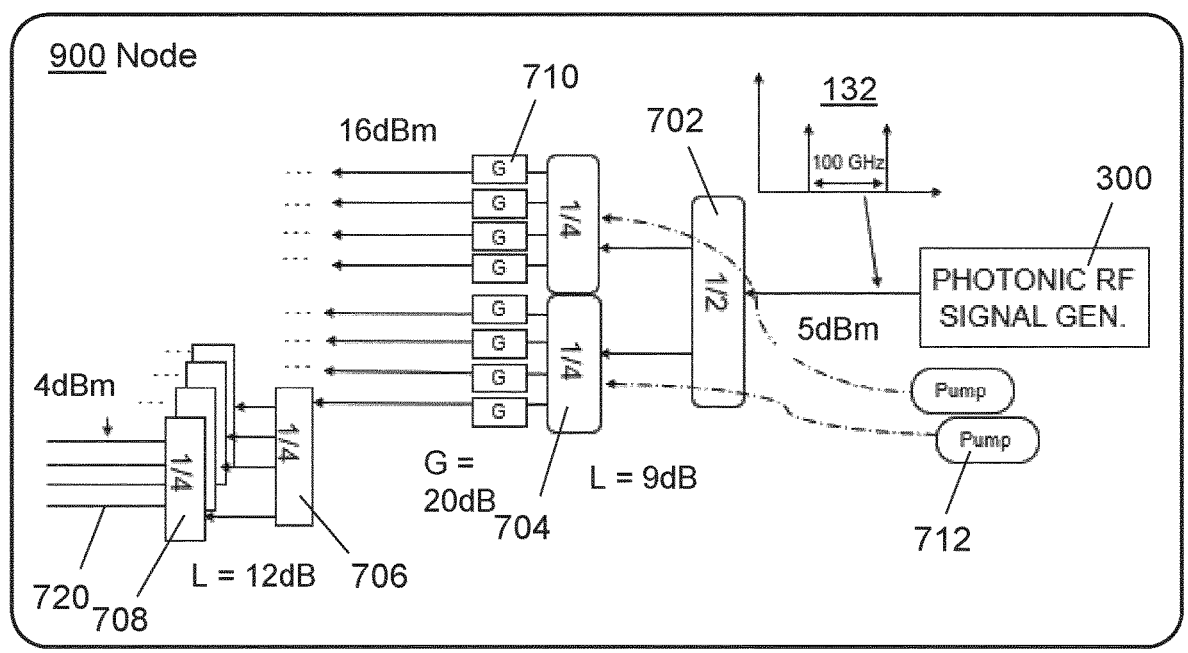

An embodiment, illustrated in FIG. 10, provides a communications network node 900 comprising photonic RF signal generation apparatus 700, as described above.

The communications network nodes 800, 900 may be a baseband unit, BBU, or may be a remote radio unit, RRU.

Figure 11:
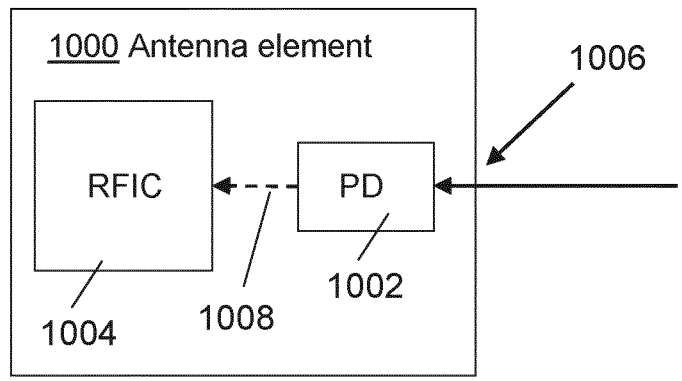
FIGS. 11 and 12 are block diagrams illustrating embodiments of communications network antenna elements.

An embodiment, illustrated in FIG. 11, provides a communications network antenna element 1000 comprising an optical input 1006, a photodetector 1002 and a radio frequency integrated circuit, RFIC, 1004.

The optical input is for receiving a photonic RF signal comprising an optical beat signal. The photodetector is configured to detect the optical beat signal and to output a corresponding electrical signal 1008 at an RF frequency, $2nf_e$. The RFIC is configured to receive the electrical signal.

In an embodiment, the electrical signal 1008 forms a reference clock signal for the RFIC 1004.

Figure 11A:
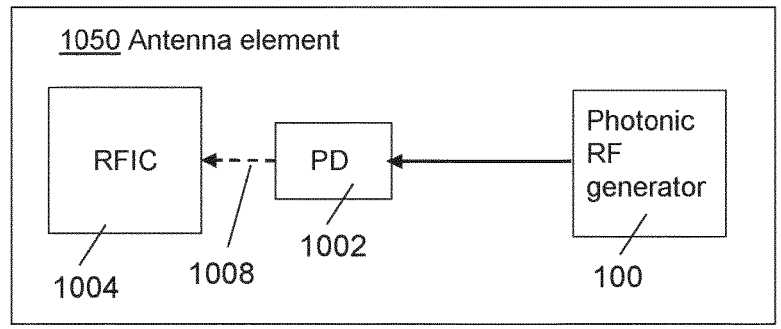
FIGS. 11A, 13 and 16 are block diagrams illustrating embodiments of RF signal multiplication apparatus.

In an embodiment, as illustrated in FIG. 11A, provides RF signal multiplication apparatus 1050, comprising the communications network antenna element 1000 of FIG. 10 combined with the photonic RF signal generation apparatus 100 of FIG. 1. It will be appreciated that any of the photonic RF signal generation apparatus 200, 300, 400, 500, 600 described above may alternatively be used.

Figure 12:
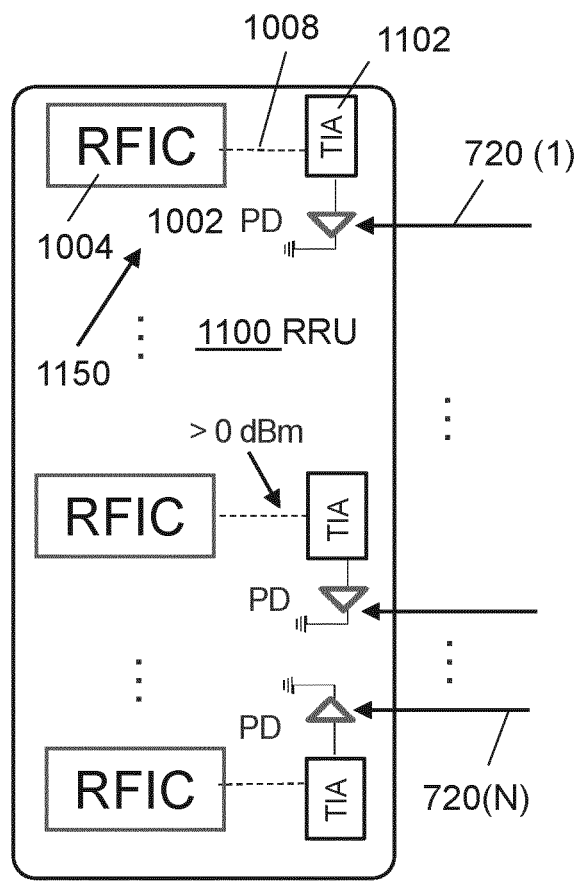

An embodiment, illustrated in FIG. 12, provides a remote radio unit, RRU, of a communications network. The RRU comprises a plurality, for example 128, of antenna elements 1150.

Each antenna element 1150 comprises an optical input 1006, a photodetector, PD, 1002, and an RFIC 1004, as described above. The optical input 1006 is for receiving a photonic RF signal 720 comprising an optical beat signal. In addition, each antenna element comprises a transimpedance amplifier, TIA, 1102 arranged to amplify the output from the photodetector to form the output electrical signal 1008 sent to the RFIC.

Figure 13:
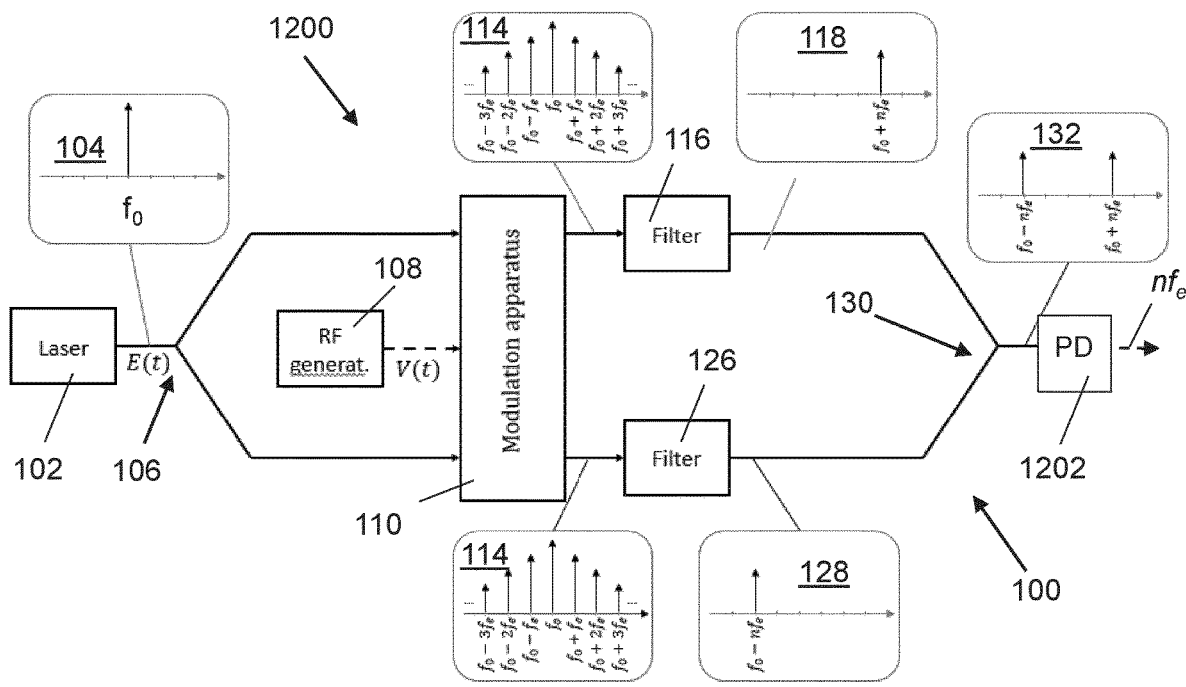

An embodiment, illustrated in FIG. 13, provides RF signal multiplication apparatus 1200 comprising RF signal generation apparatus, 100, as described above, and a photodetector 1202.

The photodetector is configured to:
receive the photonic RF signal;
detect the optical beat signal; and
output a corresponding electrical signal at a multiplied RF frequency, $2nf_e$.

In an embodiment, the multiplied RF frequency, $2nf_e$, is in the frequency range 70-120 GHz.

In an embodiment, the RF signal multiplication apparatus comprises RF signal generation apparatus 600 as described above with reference to FIG. 6.

In this embodiment, the laser 102 generates an optical carrier signal, E(t), at a carrier frequency $f_o$:

$$E(t) = E_o \cos[2\pi f_o t + \phi_o(t)]$$

The electrical RF generator 108 generates an RF signal, V(t), at an initial frequency $f_e$:

$$V(t) = V_e \cos[2\pi f_e t + \phi_e(t)]$$

The delay elements 610, 620 introduce a delay t (to be optimised depending on the RF source characteristics). The optical modulators (which may be phase or amplitude modulators) are driven by the RF signal, V(t). The optical filters 116, 126 select a single one of the optical harmonic signals ($f=f_o \pm nf_e$ in the upper/lower branch). The photodetector, which may be a photodiode, performs photodetection of the beat signal formed by the combination of the selected optical harmonic signals and generates an electrical signal at a frequency $f_{out}=2nf_e$ In an embodiment, the RF signal multiplication apparatus is implemented in silicon photonics using photonic waveguides to route the optical carrier signals through the different elements. Integrated power splitter/combiners may be used to split and recombine the optical signals and distributed feedback Bragg reflectors, DFBR, may be used as the optical filters, for their narrow passband width, enabling an optical harmonic spacing of few GHz to be used.

The optical field of the photonic RF signal, 132, before photodetection at the photodetector 1202 can be written as:

$$E(t) = E_o J_n(\beta)\left\{\cos\left[2\pi f_o(t-\tau) + 2\pi nf_e t + \phi_o(t-\tau) + n\phi_e(t) + n\frac{\pi}{2}\right] + \cos\left[2\pi(f_0 - nf_e)(t-\tau) + \phi_o(t-\tau) - n\phi_e(t-\tau) - n\frac{\pi}{2}\right]\right\},$$

where:
$E_o$ is the amplitude of the electric field of the optical carrier
$J_n$ is Bessel function of the first kind of order n
$\beta$ is the modulation index that depends on the characteristics of the modulator:

$$\beta = \frac{\pi}{2V_\pi} V_e$$

for an amplitude modulator and $$\beta = \frac{\pi}{V_\pi} V_e$$

for a phase modulator, where $V_e$ is the amplitude of the electrical drive signal and $V_\pi$ is the half-wave voltage
$\phi_o(t)$ is the phase noise of the optical carrier
$\phi_e(t)$ is the phase noise of the electric signal that drives the modulator
$\tau$ is the delay applied by the delay elements
The photo-detected signal then will give an output electrical signal proportional to $$I(t) \propto \cos[2\pi(2nf_e)t + \phi(t) + \theta]$$

where $\theta = 2\pi \cdot 2nf_e\tau + n\pi$ is a constant phase. The direct current, DC, terms that would be removed by DC blocks in the photodiode and the high frequency terms (~$2f_0$) that would be out of the photodiode bandwidth have been removed.

Given the initial frequency $f_e$ generated by the RF generator, the output electrical signal will be at a frequency that is multiplied by 2n times. The phase noise, $\phi(t)$, of the output electrical signal is given by:

$$\phi(t) = n(\phi_e(t) + \phi_e(t-\tau))$$

From which it can be seen that the phase noise of the output electrical signal depends on the delay introduced to the first optical carrier signal before it is modulated by the optical modulator 412. From this, the spectral density of the phase noise of the output electrical signal is given by $$S_\phi(f) = S_{\phi_e}(f)(2n)^2 \cos^2(\pi\tau f)$$

It is therefore possible to cancel the phase noise of the output electrical signal for certain frequencies by applying an appropriate delay. Notches may therefore be produced in the phase noise spectrum of the output electrical signal, as illustrated in FIGS. 13 and 14.

Figure 15:
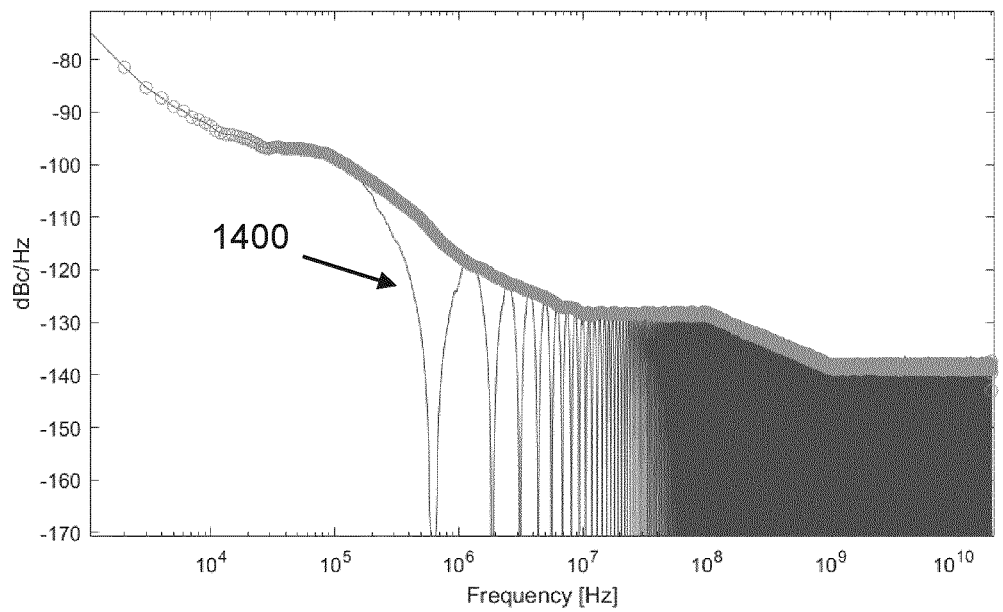

FIG. 14 shows a simulation of the power spectral density of the phase noise (normalized to the power of the optical beat signal) obtained from the multiplication of an RF source via the generation of two optical harmonics. FIG. 15 shows a comparison of the phase noise spectrum of an output electrical signal from the RF signal generation apparatus and the phase noise spectrum of a multiplied RF signal generated without the phase noise cancellation implemented in the RF signal generation apparatus. The thick curve is the result that would be obtained without noise cancellation and the thin curve is that obtained with noise cancellation.

In this simulation: the delay is τ=0.4 µs, the fifth order optical harmonic signals ($f=f_o\pm5f_e$) are used, the initial frequency generated by the RF generator is $f_e$=5 GHz. The notches have a spacing, $f_m$, of 240 kHz.

The phase noise power spectral density is:

$$L_{opt}\left(\frac{dBc}{Hz}\right) = L_e\left(\frac{dBc}{Hz}\right) + 20\ \log(2n) + 10\ \log\left[\cos^2(\pi\tau f)\right]$$

It can be seen from FIG. 15 that, without the decoupling of the electric phase noise, the electric phase noise is multiplied by 2n, resulting in the term 20 log(2n) of the above equation. The term 10 log [$\cos^2(\pi\tau f)$] is the additional term coming from introducing the delay in one optical path before modulation of the first carrier signal. This term can be made negative to compensate for the electrical noise to cancel the noise for given values of frequency, i.e. the notches shown in FIG. 15. The frequencies for which the noise cancels out can be conveniently chosen to correspond to subcarrier locations, by selecting the appropriate value of t to fit with the subcarrier spacing.

The optical filters 116, 126 are configured to exclude spurious frequencies from the other optical harmonics near the selected one. The optical filters thus preferably have a transmission bandwidth that is narrower than the optical harmonic spacing. The choice of the modulation frequency then is related to the characteristics of the optical filters that are used. A convenient choice for implementation could be a modulation frequency, i.e. an RF signal, V(t), having an initial frequency, $f_e$, in the range of 5-15 GHz which allows to exploit the advantages of low noise frequency multiplication while allowing optical filtering with, for example narrowband DFBRs. The multiplied RF frequency, $2nf_e$, is in the frequency range 70-120 GHZ.

The RF signal multiplication apparatus advantageously enables a high-frequency RF carrier to be produced by the multiplication of a low frequency oscillator or synthesizer, without adding any extra phase noise and reducing the phase noise inherited from the low-frequency oscillator.

The apparatus enables deep notches to be formed in the phase noise profile out the output electrical signal at selected frequencies, $f_m$ (where $f_m$ is the distance from the carrier frequency), that substantially cancel the phase noise locally and produce an overall decrease of the phase noise. The location of the notches can be selected by controlling the amount of delay τ applied to the first optical carrier so that they correspond to the zeros of the function $\cos^2(\tau\pi f_m)$. For an OFDM transmission scheme, the apparatus enables phase noise to be cancelled at the subcarrier frequencies so that it is not necessary to allow extra spacing between subcarriers and spectral efficiency is increased. The delay t can be tuned to account for carrier spacing flexibility in 5G with a single design, avoiding hardware variants.

Figure 16:
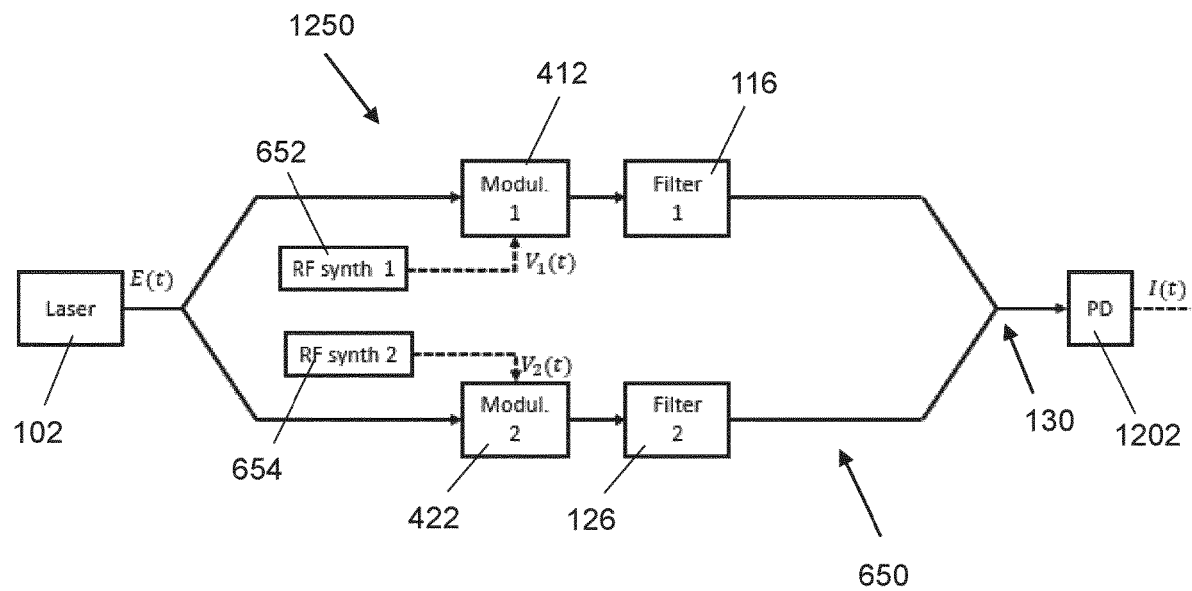

An embodiment, illustrated in FIG. 16, provides RF signal multiplication apparatus 1250 comprising RF signal generation apparatus, 650, as described above, and a photodetector 1202.

The photodetector 1202 is configured to:
receive the photonic RF signal;
detect the optical beat signal; and
output a corresponding electrical signal at a multiplied RF frequency, $2nf_e$.

In an embodiment, the multiplied RF frequency, $2nf_e$, is in the frequency range 70-120 GHz.

Figure 17:
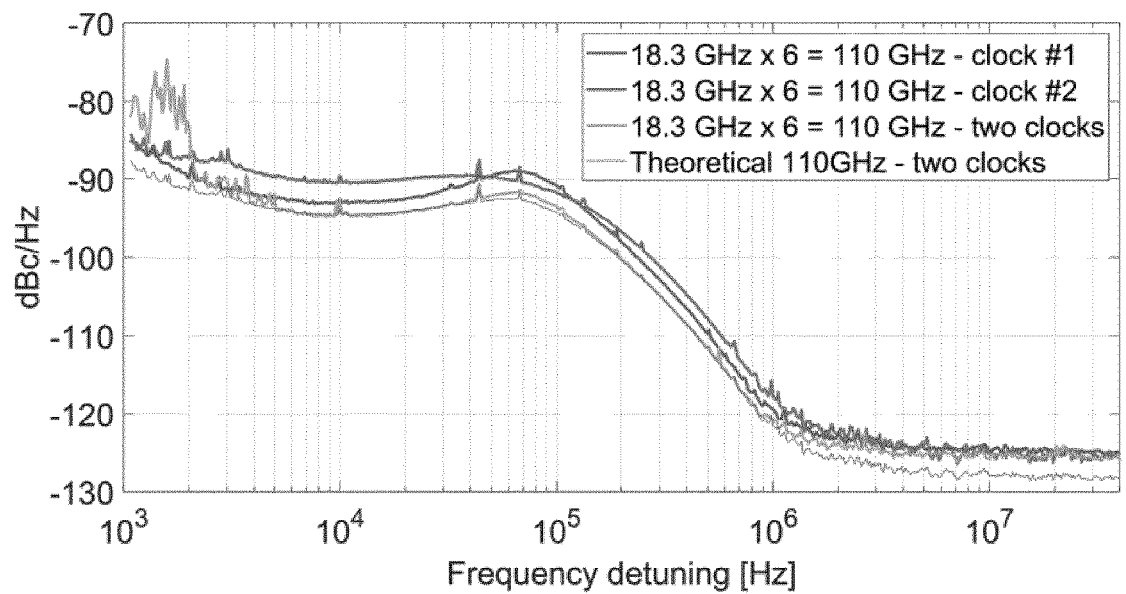
FIG. 17 shows experimental results.

FIG. 17 illustrates experimental results obtained using the RF signal multiplication apparatus 1250, to generate an electrical RF carrier at 110 GHz. The RF signal generators 652, 654 of the RF signal generation apparatus 650 were configured to generate first and second RF signals at initial frequency, $f_e$, of 18.3 GHZ and the first and second optical filters 116, 126 were configured to select the $3^{th}$ order harmonics, i.e. $f=f_o+3f_e$ and $f=f_o-3f_e$, to multiply the initial frequency by a factor of 6.

Figure 18:
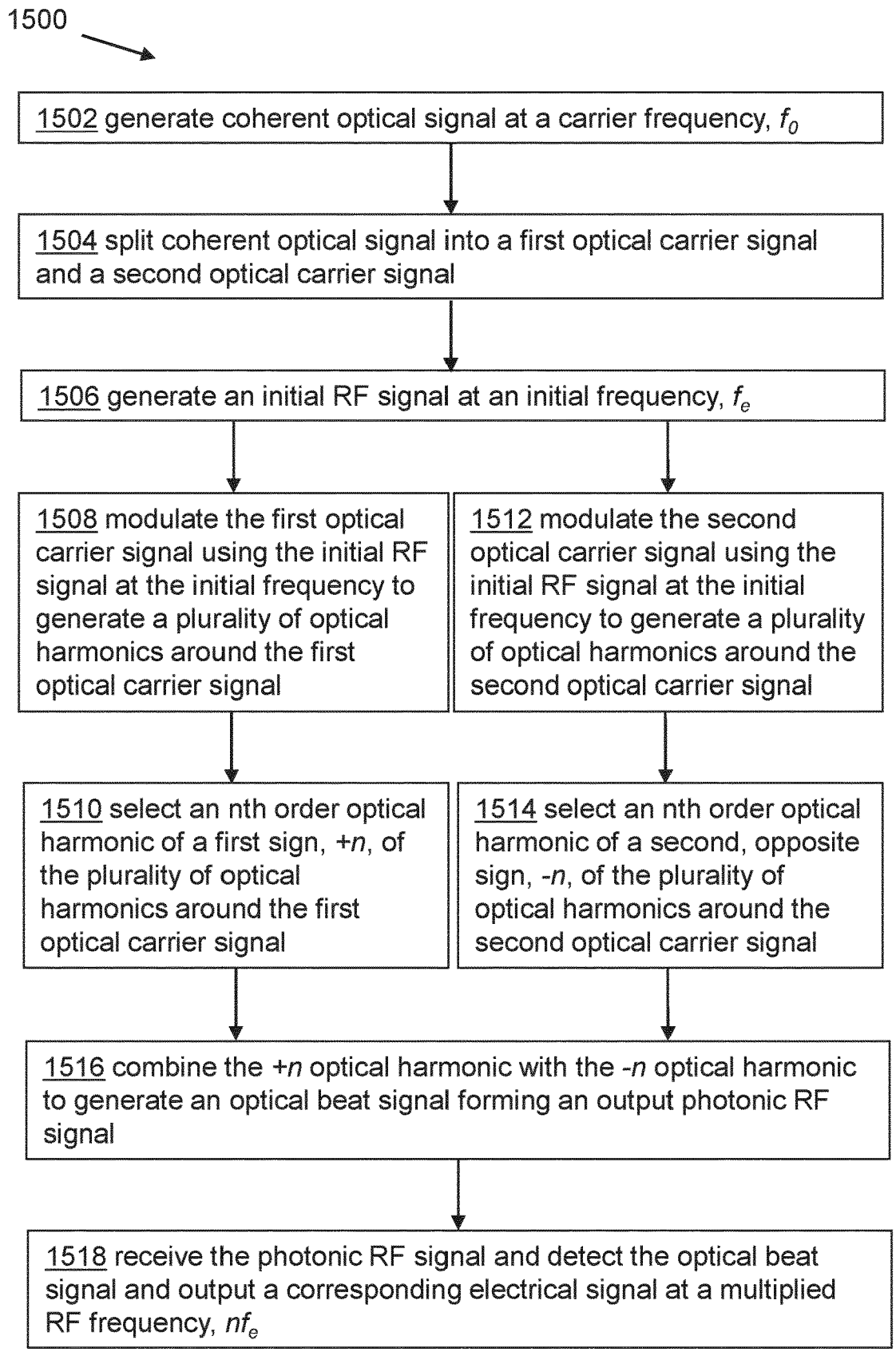
FIGS. 18 to 20 are flowcharts illustrating embodiments of method steps.

The curves shown in FIG. 17 compare the case where a single RF signal generator, i.e. a single RF signal (clock) is used to drive the two modulators and the case where each modulator is driven by a different RF signal generator, i.e. two RF signals (clocks) with uncorrelated phase, as in the RF signal generation apparatus 650. The theoretical curve for two uncorrelated RF signals is shown for comparison. The reduction of phase noise is about 3 dB, i.e. 50%, in agreement with the modelling discussed above. Referring to FIG. 18, an embodiment provides a method 1500 of generating a multiplied radio frequency, RF, signal. The method comprises generating 1502 a coherent optical signal at a carrier frequency, $f_0$. The coherent optical signal is split 1504 into a first optical carrier signal and a second optical carrier signal.

An initial RF signal is generated 1506 at an initial frequency, $f_e$.

The first optical carrier signal is modulated 1508 using the initial RF signal at the initial frequency to generate a plurality of optical harmonic signals around the first optical carrier signal. An nth order optical harmonic signal of a first sign, +n, is selected from the plurality of optical harmonic signals around the first optical carrier signal.

The second optical carrier signal is also modulated 1512 using the initial RF signal at the initial frequency to generate the same plurality of optical harmonic signals around the second optical carrier signal. The same, nth, order optical harmonic signal of the opposite sign, −n, is selected 1514 from the plurality of optical harmonic signals around the second optical carrier signal.

The selected +n optical harmonic signal is combined 1516 with the selected −n optical harmonic signal to generate an optical beat signal forming an output photonic RF signal. The photonic RF signal is received 1518, the optical beat signal is detected and a corresponding electrical signal at a multiplied RF frequency, $2nf_e$, is output.

In an embodiment, a first RF signal ($V_1(t)$) is generated at the initial frequency, $f_e$, having a first phase, $\phi_{e1}(t)$, and a second RF signal ($V_2(t)$) is generated at the initial frequency, $f_e$, having a second phase, $\phi_{e2}(t)$, uncorrelated to the first phase. The first optical carrier signal is modulated using the first RF signal ($V_1(t)$) and the second optical carrier signal is modulated using the second RF signal ($V_2(t)$).

In an embodiment, the electrical signal forms a reference clock signal.

In an embodiment, the multiplied RF frequency, $2nf_e$, is in the frequency range 70-120 GHz.

Figure 19:
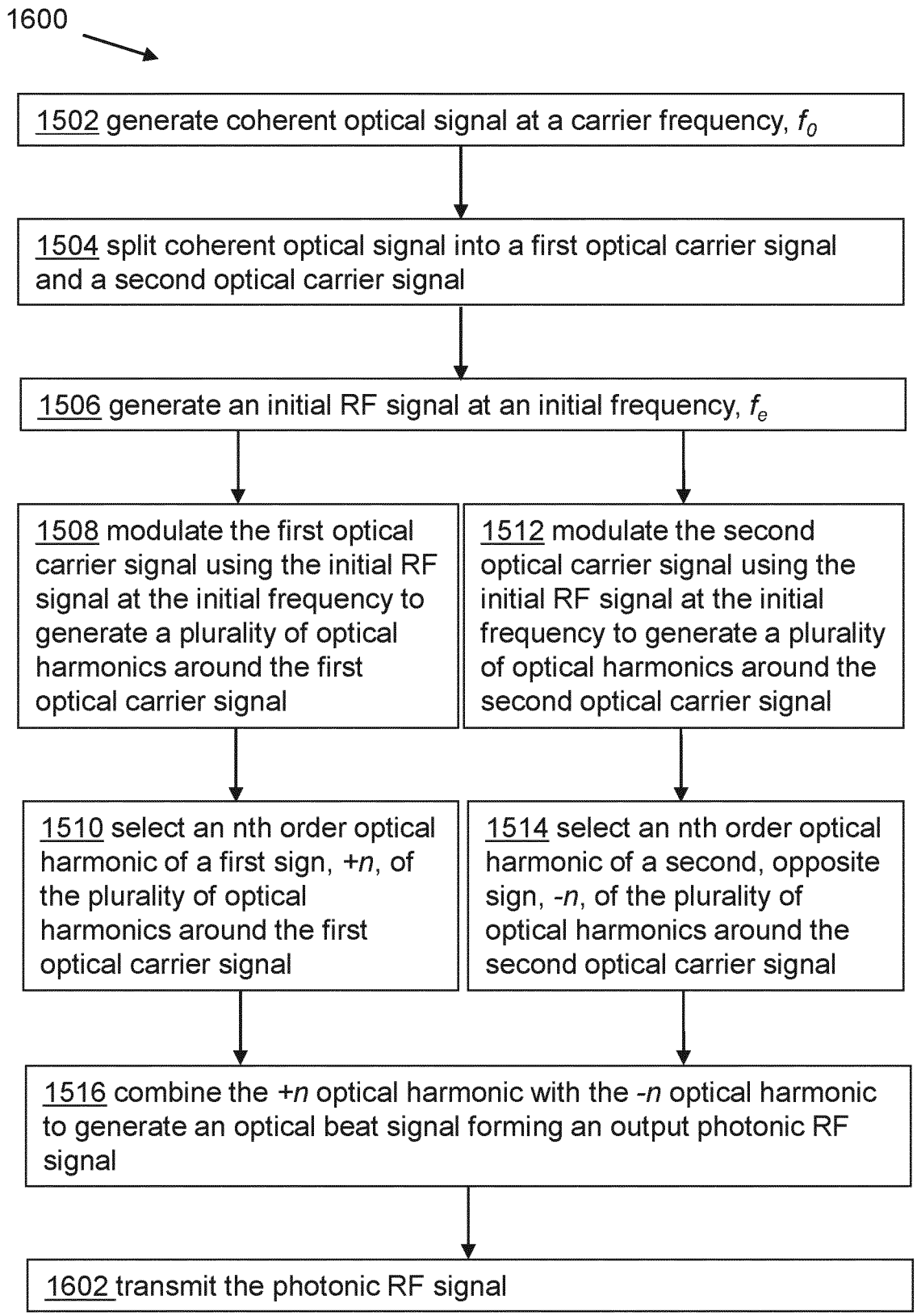

Referring to FIG. 19, an embodiment provides a method 1600 of generating a radio frequency, RF, signal. This method may be performed at a communications network node. The method comprises generating 1502 a coherent optical signal at a carrier frequency, $f_0$. The coherent optical signal is split 1504 into a first optical carrier signal and a second optical carrier signal.

An initial RF signal is generated 1506 at an initial frequency, $f_e$.

The first optical carrier signal is modulated 1508 using the initial RF signal at the initial frequency to generate a plurality of optical harmonic signals around the first optical carrier signal. An nth order optical harmonic signal of a first sign, +n, is selected from the plurality of optical harmonic signals around the first optical carrier signal.

The second optical carrier signal is also modulated 1512 using the initial RF signal at the initial frequency to generate the same plurality of optical harmonic signals around the second optical carrier signal. The same, nth, order optical harmonic signal of the opposite sign, −n, is selected 1514 from the plurality of optical harmonic signals around the second optical carrier signal.

The selected +n optical harmonic signal is combined 1516 with the selected −n optical harmonic signal to generate an optical beat signal forming an output photonic RF signal, and the photonic RF signal is transmitted 1602.

In an embodiment, the method further comprises applying a delay, τ, to the first optical carrier signal before modulating the first optical carrier signal, and applying the delay, τ, to the selected −n optical harmonic signal before combining with the selected +n optical harmonic signal.

Figure 20:
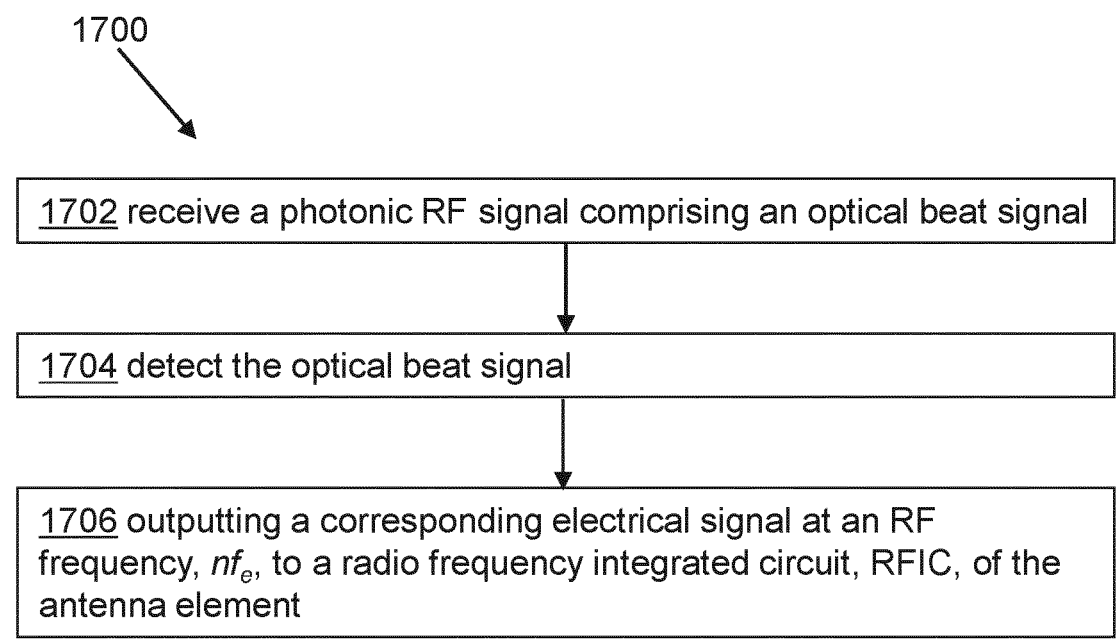

Referring to FIG. 20, an embodiment provides a method 1700 at an antenna element. The method comprises receiving 1702 a photonic RF signal comprising an optical beat signal. The optical beat signal is detected 1704 and a corresponding electrical signal at an RF frequency, $2nf_e$, is output to a radio frequency integrated circuit, RFIC, of the antenna element.

In an embodiment, the electrical signal forms a reference clock signal for the RFIC.

The invention claimed is:

1. A photonic radio frequency, RF, signal generation apparatus comprising:
   a coherent optical source operable to output a coherent optical signal at a carrier frequency, $f_0$;
   an optical splitter arranged to split the coherent optical signal into a first optical carrier signal and a second optical carrier signal;
   RF signal generation apparatus configured to generate at least one RF signal (V(t)) at an initial frequency, $f_e$;
   optical modulation apparatus driven by the at least one RF signal and configured to modulate the first optical carrier signal and the second optical carrier signal at the initial frequency to generate a plurality of optical harmonic signals around each optical carrier signal;
   a first optical filter configured to select an nth order optical harmonic signal of a first sign, +n, of the plurality of optical harmonics around the first optical carrier signal;
   a second optical filter configured to select the nth order optical harmonic signal of an opposite sign, −n, of the plurality of optical harmonics around the second optical carrier signal; and
   an optical combiner arranged to combine the selected +n optical harmonic signal with the selected −n optical harmonic signal to generate an optical beat signal forming an output photonic RF signal; and
   an optical delay apparatus arranged to apply a delay, τ, to optical signals, the optical delay apparatus being arranged to apply the delay to the first optical carrier signal before the first optical carrier signal is modulated by the optical modulation apparatus and to apply the delay to at least the −n optical harmonic signal before the optical combiner combines the −n optical harmonic signal with the selected +n optical harmonic signal.

2. The photonic RF signal generation apparatus as claimed in claim 1, wherein the optical modulation apparatus comprises a bi-directional optical modulator and wherein the apparatus further comprises:
   a first optical path from the optical splitter to the optical combiner for the first optical carrier signal, the first optical path including:
      a path section including the bi-directional optical modulator operable to modulate the first optical carrier signal propagating in a first direction;
      the optical delay apparatus; and
      the first optical filter; and
   a second optical path from the optical splitter to the optical combiner for the second optical carrier signal, the second optical path including:
      the path section including the bi-directional optical modulator further configured to modulate the second optical carrier signal propagating in a second, opposite direction;
      the optical delay apparatus; and
      the second optical filter.

3. The photonic RF signal generation apparatus as claimed in claim 1, wherein the optical modulation apparatus comprises a first optical modulator configured to modulate the first optical carrier signal and a second optical modulator configured to modulate the second optical carrier signal and wherein the apparatus further comprises:
   a first optical path from the optical splitter to the optical combiner for the first optical carrier signal, the first optical path including the first optical modulator, the optical delay apparatus and the first optical filter; and
   a second optical path from the optical splitter to the optical combiner for the second optical carrier signal, the second optical path including the second optical modulator, the optical delay apparatus and the second optical filter.

4. The photonic RF signal generation apparatus as claimed in claim 1, wherein the optical delay apparatus is a bi-directional delay element configured to apply the delay, τ, to optical signals, the bi-directional delay element provided within an optical path section included in the first optical path to apply the delay to the first optical carrier signal and included in the second optical path to apply the delay to at least the −n optical harmonic signal.

5. The photonic RF signal generation apparatus as claimed in claim 4, wherein the optical delay apparatus comprises:
   a first delay element provided in the first optical path before the first optical modulator and configured to apply the delay, τ, to the first optical carrier signal; and
   a second delay element provided in the second optical path after the second optical modulator and configured to apply the delay, τ, to at least the −n optical harmonic signal.

6. The photonic RF signal generation apparatus as claimed in claim 5, wherein the optical delay apparatus is a tunable optical delay apparatus.

7. The photonic RF signal generation apparatus as claimed in claim 1, wherein:
the RF signal generation apparatus comprises a first RF signal generator operable to generate a first RF signal ($V_1(t)$) at the initial frequency, $f_e$, having a first phase, $\phi_{e1}(t)$, and a second RF signal generator operable to generate a second RF signal ($V_2(t)$) at the initial frequency, $f_e$, having a second phase, $\phi_{e2}(t)$, uncorrelated to the first phase; and
the optical modulation apparatus comprises a first optical modulator driven by the first RF signal ($V_1(t)$) and a second optical modulator driven by the second RF signal ($V_2(t)$), wherein the first optical modulator is operable to modulate the first optical carrier signal and the second optical modulator is operable to modulate the second optical carrier signal.

8. The photonic RF signal generation apparatus as claimed in claim 1, wherein the first and second optical filters are tunable optical filters.

9. The photonic RF signal generation apparatus as claimed in claim 1, wherein the first and second optical filters are configured to select one of a first order to a tenth order optical harmonic signal of the plurality of optical harmonic signals.

10. The photonic RF signal generation apparatus as claimed in claim 1, wherein the initial RF frequency, $f_e$, is in the range 5-15 GHz.

11. The photonic RF signal generation apparatus as claimed in claim 1, further comprising a plurality of optical splitters configured to split the optical beat signal to form a plurality of output photonic RF signals.

12. The photonic RF signal generation apparatus as claimed in claim 11, wherein the plurality of optical splitters are arranged in a plurality of splitting stages and wherein at least a second one of the plurality of splitting stages is followed by an amplification stage comprising a plurality of optical amplifiers arranged to amplify respective optical beat signals.

13. The photonic RF signal generation apparatus as claimed in claim 1, wherein the photonic RF signal generation apparatus is comprised in a communications network node.

14. A radio frequency, RF, signal multiplication apparatus comprising:
a coherent optical source operable to output a coherent optical signal at a carrier frequency, $f_0$;
an optical splitter arranged to split the coherent optical signal into a first optical carrier signal and a second optical carrier signal;
RF signal generation apparatus operable to generate at least one RF signal ($V(t)$) at an initial frequency, $f_e$;
optical modulation apparatus driven by the at least one RF signal and configured to modulate the first optical carrier signal and the second optical carrier signal at the initial frequency to generate a plurality of optical harmonic signals around each optical carrier signal;
a first optical filter configured to select an nth order optical harmonic of a first sign, +n, of the plurality of optical harmonics around the first optical carrier signal;
a second optical filter configured to select the nth order harmonic signal of an opposite sign, −n, of the plurality of optical harmonic signals around the second optical carrier signal;
an optical combiner arranged to combine the selected +n optical harmonic signal with the selected −n optical harmonic signal to generate an optical beat signal forming an output photonic RF signal; and
a photodetector configured to receive the photonic RF signal and configured to detect the optical beat signal and output a corresponding electrical signal at a multiplied RF frequency, $2nf_e$;
an optical delay apparatus arranged to apply a delay, $\tau$, to optical signals, the optical delay apparatus being arranged to apply the delay to the first optical carrier signal before the first optical carrier signal is modulated by the optical modulation apparatus and to apply the delay to at least the −n optical harmonic signal before the optical combiner combines the −n optical harmonic signal with the selected +n optical harmonic signal.

15. The RF signal multiplication apparatus as claimed in claim 14, wherein the multiplied RF frequency, $2nf_e$, is in the frequency range 70-120 GHz.

16. The RF signal multiplication apparatus as claimed in claim 14, further comprising a radio frequency integrated circuit, RFIC, configured to receive the electrical signal.

17. A method of generating a multiplied radio frequency, RF, signal, the method comprising:
generating a coherent optical signal at a carrier frequency, $f_0$;
splitting the coherent optical signal into a first optical carrier signal and a second optical carrier signal;
generating at least one initial RF signal at an initial frequency, $f_e$;
modulating the first optical carrier signal using the at least one initial RF signal at the initial frequency to generate a plurality of optical harmonic signals around the first optical carrier signal;
selecting an nth order optical harmonic signal of a first sign, +n, of the plurality of optical harmonic signals around the first optical carrier signal;
modulating the second optical carrier signal using the at least one initial RF signal at the initial frequency to generate said plurality of optical harmonic signals around the second optical carrier signal;
selecting the nth order optical harmonic signal of an opposite sign, −n, of the plurality of optical harmonic signals around the second optical carrier signal;
combining the selected +n optical harmonic signal with the selected −n optical harmonic signal to generate an optical beat signal forming an output photonic RF signal; and
receiving the photonic RF signal and detecting the optical beat signal and outputting a corresponding electrical signal at a multiplied RF frequency, $2nf_e$; and applying a delay, $\tau$, to the first optical carrier signal and applying the delay to at least the −n optical harmonic signal, the delay, $\tau$, being applied to the first optical carrier signal before modulating the first optical carrier signal and the delay, $\tau$, is applied to the −n optical harmonic signal before combining with the selected +n optical harmonic signal.

18. A method of generating a photonic radio frequency, RF, signal, the method comprising:
generating a coherent optical signal at a carrier frequency, $f_0$;
splitting the coherent optical signal into a first optical carrier signal and a second optical carrier signal;
generating at least one initial RF signal at an initial frequency, $f_e$;

modulating the first optical carrier signal using the at least one initial RF signal at the initial frequency to generate a plurality of optical harmonic signals around the first optical carrier signal;

selecting an nth order optical harmonic signal of a first sign, +n, of the plurality of optical harmonic signals around the first optical carrier signal;

modulating the second optical carrier signal using the at least one initial RF signal at the initial frequency to generate said plurality of optical harmonic signals around the second optical carrier signal;

selecting the nth order optical harmonic signal of an opposite sign, −n, of the plurality of optical harmonic signals around the second optical carrier signal;

combining the selected +n optical harmonic signal with the selected −n optical harmonic signal to generate an optical beat signal forming a photonic RF signal;

transmitting the photonic RF signal; and applying a delay, $\tau$, to the first optical carrier signal and applying the delay to at least the −n optical harmonic signal, the delay, $\tau$, being applied to the first optical carrier signal before modulating the first optical carrier signal and the delay, $\tau$, is applied to the −n optical harmonic signal before combining with the selected +n optical harmonic signal.

19. The method of claim 18, wherein generating the at least one initial RF signal comprises generating a first RF signal ($V_1(t)$) at the initial frequency, $f_e$, having a first phase, $\phi_{e1}(t)$, and generating a second RF signal ($V_2(t)$) at the initial frequency, $f_e$, having a second phase, $\phi_{e2}(t)$, uncorrelated to the first phase, and wherein the first optical carrier signal is modulated using the first RF signal ($V_1(t)$) and the second optical carrier signal is modulated using the second RF signal ($V_2(t)$).

* * * * *